United States Patent
Simpson et al.

(10) Patent No.: US 11,060,668 B2
(45) Date of Patent: Jul. 13, 2021

(54) MULTIPLE TRANSDUCER METHOD AND SYSTEM FOR PIPELINE ANALYSIS

(71) Applicant: ADELAIDE RESEARCH & INNOVATION PTY LTD, Adelaide (AU)

(72) Inventors: Angus R. Simpson, Adelaide (AU); Martin F. Lambert, Adelaide (AU); Aaron C. Zecchin, Adelaide (AU); He Shi, Adelaide (AU); Jinzhe Gong, Adelaide (AU)

(73) Assignee: Adelaide Research & Innovation Pty Ltd, Adelaide (AU)

( * ) Notice: Subject to any disclaimer, the term of this patent is extended or adjusted under 35 U.S.C. 154(b) by 65 days.

(21) Appl. No.: 15/744,715

(22) PCT Filed: Jul. 16, 2015

(86) PCT No.: PCT/AU2015/000415
§ 371 (c)(1),
(2) Date: Jan. 12, 2018

(87) PCT Pub. No.: WO2017/008098
PCT Pub. Date: Jan. 19, 2017

(65) Prior Publication Data
US 2018/0202612 A1      Jul. 19, 2018

(51) Int. Cl.
*F17D 5/02*       (2006.01)
*G01B 17/02*    (2006.01)
(Continued)

(52) U.S. Cl.
CPC ............... *F17D 5/02* (2013.01); *F17D 5/06* (2013.01); *G01B 13/06* (2013.01); *G01B 13/08* (2013.01);
(Continued)

(58) Field of Classification Search
CPC ........ G01B 13/06; G01B 13/08; G01B 17/02; G01M 3/26; G01M 3/28; G01M 3/2807;
(Continued)

(56) References Cited

U.S. PATENT DOCUMENTS

2007/0107777 A1*  5/2007  Catron ................. G05D 7/0635
                                                                    137/2
2010/0192703 A1*  8/2010  Huang ..................... G01F 1/66
                                                                  73/861.28
(Continued)

FOREIGN PATENT DOCUMENTS

GB         2444955 A       6/2008
WO    2010/017599 A1      2/2010
(Continued)

OTHER PUBLICATIONS

International Search Report dated Oct. 7, 2015, issued in corresponding International Application No. PCT/AU2015/000415, filed Jul. 16, 2015, 4 pages.
(Continued)

*Primary Examiner* — Benjamin R Schmitt
(74) *Attorney, Agent, or Firm* — Christensen O'Connor Johnson Kindess PLLC

(57) ABSTRACT

A method and system for assessing the condition of a pipeline in a pipeline system is disclosed. The method includes generating a pressure wave in the fluid being carried along the pipeline system at a pressure wave generating location along the pipeline system and detecting pressure wave interaction signals at two closely spaced measurement locations along the pipeline. The method then includes determining a system response function for the pipeline based on the detected pressure wave interaction signals for each measurement location and characterising the pipeline based on the system response function.

22 Claims, 15 Drawing Sheets

(51) Int. Cl.
| | |
|---|---|
| *G01M 3/28* | (2006.01) |
| *G01L 15/00* | (2006.01) |
| *F17D 5/06* | (2006.01) |
| *G01B 13/06* | (2006.01) |
| *G01B 13/08* | (2006.01) |
| *G01N 19/08* | (2006.01) |
| *E03B 7/07* | (2006.01) |

(52) U.S. Cl.
CPC .............. *G01B 17/02* (2013.01); *G01L 15/00* (2013.01); *G01M 3/2815* (2013.01); *G01N 19/08* (2013.01); *E03B 7/071* (2013.01)

(58) Field of Classification Search
CPC ...... G01M 3/2815; G01L 15/00; E03B 7/003; E03B 7/071; F17D 5/02; F17D 5/06; E21B 47/06; E21B 47/101; E21B 47/14; E21B 47/18; E21B 49/006
USPC ......... 73/49.1, 49.5, 152.18, 152.22, 152.51, 73/152.52; 702/6
See application file for complete search history.

(56) References Cited

U.S. PATENT DOCUMENTS

| | | | |
|---|---|---|---|
| 2012/0041694 A1 | 2/2012 | Stephens et al. | |
| 2014/0200836 A1* | 7/2014 | Lee ........................... | G01F 1/34 702/47 |
| 2015/0300907 A1* | 10/2015 | Giunta .................. | G01M 3/243 702/39 |

FOREIGN PATENT DOCUMENTS

| | | |
|---|---|---|
| WO | 2013/072685 A2 | 5/2013 |
| WO | 2017/008100 A1 | 1/2017 |

OTHER PUBLICATIONS

International Preliminary Report on Patentability and Written Opinion of the International Searching Authority dated Jan. 16, 2018, issued in corresponding International Application No. PCT/AU2015/000415, filed Jul. 16, 2015, 7 pages.

Gong, J., et al., "Distributed deterioration detection in single pipelines using transient measurements from pressure transducer pairs," Proceedings of the 11th International Conference on Pressure Surges, BHR Group, Cranfield, UK, pp. 127-140, Jan. 2012.

Gong, J., et al., "Signal separation for transient wave reflections in single pipelines using inverse filters," Proceedings of the World Environmental & Water Resources Congress 2012, ASCE, Reston, VA, 3275-3284, May 2012.

Gong, J., et al., "Detection of distributed deterioration in single pipes using transient reflections," Journal of Pipeline Systems Engineering and Practice 4(1):32-40, Feb. 2013.

Gong, J., et al., "Detection of localized deterioration distributed along single pipelines by reconstructive MOC analysis," Journal of Hydraulic Engineering 140(2):190-198, Feb. 2014.

Zecchin, A.C., et al., "Condition assessment in hydraulically noisy pipeline systems using a pressure wave splitting method," Procedia Engineering, 89(2014):1336-1342, 2014.

* cited by examiner

US 11,060,668 B2

MULTIPLE TRANSDUCER METHOD AND SYSTEM FOR PIPELINE ANALYSIS

INCORPORATION BY REFERENCE

The following publications are referred to in the present application and their contents are hereby incorporated by reference in their entirety:

Australian Provisional Application No. 2015902731, titled "SYSTEM AND METHOD FOR GENERATION OF A PRESSURE SIGNAL", filed 10 Jul. 2015;

International Patent Application No. PCT/AU2009/001051 (WO/2010/017599) titled "METHOD AND SYSTEM FOR ASSESSMENT OF PIPELINE CONDITION" in the name of Adelaide Research & Innovation Pty Ltd;

Gong, J., Lambert, M. F., Simpson, A. R., and Zecchin, A. C. (2012). "Distributed deterioration detection in single pipelines using transient measurements from pressure transducer pairs", *Proceedings of the 11th International Conference on Pressure Surges*, BHR Group, Cranfield, UK, 127-140;

Gong, J., Zecchin, A. C., Lambert, M. F., and Simpson, A. R. (2012). "Signal separation for transient wave reflections in single pipelines using inverse filters", *Proceedings of the World Environmental & Water Resources Congress 2012*, ASCE, Reston, Va., 3275-3284;

Zecchin, A. C., Gong, J., Simpson, A. R. and Lambert, M. F. (2014) "Condition assessment in hydraulically noisy pipeline systems using a pressure wave splitting method", *Procedia Engineering*, 89, 1336-1342;

Gong J, Simpson A R, Lambert M F, et al., "Detection of distributed deterioration in single pipes using transient reflections", *J Pipeline Syst Eng Pract*, 2013; 4: 32-40; and Gong, J., Lambert, M. F., Simpson, A. R. and Zecchin, A. C. (2014). "Detection of localized deterioration distributed along single pipelines by reconstructive MOC analysis." *J Hydraulic Eng*, 140(2), 190-198.

TECHNICAL FIELD

The present disclosure relates to assessing the condition of a pipeline system. In a particular form, the present disclosure relates to assessing a section of pipeline employing pressure waves generated in the fluid carried by the pipeline system.

BACKGROUND

Water transmission and distribution pipelines are critical infrastructure for modern cities. Due to the sheer size of the networks and the fact that most pipelines are buried underground, the health monitoring and maintenance of this infrastructure is challenging. Similarly, pipes and pipeline systems may be used to convey any number of types of fluid ranging from petroleum products to natural gas. Structural deterioration is a common problem for pipeline systems including aging water distribution pipelines. Unlike leakages or discrete blockages, structural deterioration can be large scale and distributed, and includes the following categories: internal or external corrosion; spalling of cement mortar lining; extended blockages due to tuberculation or sedimentation; graphitisation; and structurally weak sections caused by cracks in the pipe wall or backfill concrete.

Areas of distributed deterioration can impose a number of negative impacts on pipeline operation, such as a decrease in discharge capacity, an increase in energy consumption, and in the case of water distribution pipelines the problem of degraded water quality resulting in public health risks. Moreover, distributed deterioration may also develop to the point of severe obstructions or bursts over time. As a result, it is preferable to detect distributed deterioration in pipeline systems at an early stage, with the intention of conducting targeted maintenance and rehabilitation before a catastrophic structural failure occurs.

At present, several pipeline condition assessment techniques are available, but they all have limitations. For example, closed-circuit television (CCTV) inspection captures images of a pipe's inner surface using a camera on a carrier that travels within the pipeline. However, this method is costly and not reliable for identifying the severity of deterioration (eg, the depth of a crack). Ground penetrating radar (GPR) uses electromagnetic wave pulses and their reflections to identify the interface between different materials underground (such as regions of high soil moisture content resulting from a leak), but it is not accurate enough for assessing the wall condition of buried pipelines.

Surface penetrating radar (SPR) and in-pipe GPR techniques apply electromagnetic sensors directly to the outside or inside surface of a pipeline, but they are mainly utilised for localised inspection and are inefficient and costly for long range applications. The guided wave ultrasound method uses ultrasonic waves propagating along the pipe wall and their reflections to determine the location and sizes of defects on the wall, but the range of inspection is limited in buried pipes due to the rapid signal attenuation.

Among the different pipeline condition assessment technologies that are being developed, methods based on fluid transients or pressure waves have shown some potential. In fluid transient-based techniques, controlled transient pressure waves to interrogate the pipeline system are created by artificially accelerating or decelerating the fluid in the pipeline. For example, an abrupt closure of an in-line or side-discharge valve can introduce a step pressure wave. These pressure waves travel at high speed inside a fluid-filled pipe and reflections occur when the wave encounters any physical anomalies along the pipeline. The pressure wave reflections can be measured by pressure transducers and then interpreted through signal processing methods to assess the condition of the pipe. These techniques are efficient compared to other condition assessment techniques methods because the transient data as measured by the pressure transducers, just lasting a few seconds, can provide information about the wall condition of a pipeline stretching thousands of meters. The technique also has a wide operational range, since it can be applied to various types of pipelines either elevated or buried.

Fluid transient techniques have been successively applied to some limited pipeline assessment tasks such as leak detection. In terms of the detection of distributed deterioration, such as wall thickness changes due to large scale corrosion, in our earlier PCT Patent Application No. PCT/AU2009/001051 (WO/2010/017599) titled "METHOD AND SYSTEM FOR ASSESSMENT OF PIPELINE CONDITION", the Applicant here disclosed a method and system for determining the location and extent of multiple variations in pipeline condition based on an inverse transient analysis (ITA) which adopted an iterative approach to determine a full condition assessment of a pipeline based on optimisation techniques. While this approach has been very successful, it can become extremely computationally intensive for complex pipeline systems.

Some attempts have been made to employ fluid transient techniques without having to resort to a full ITA but these techniques have difficulties in dealing with pipelines having multiple deteriorated sections or complex structures or topologies (eg, with branches, pumps and other hydraulic components), and in particular with the complexity of the measured pressure traces due to the multiple reflections occurring within, and in between, the deteriorated sections and hydraulic components. Other techniques are able to detect multiple deteriorated sections but are only applicable to a limited set of pipeline geometries (eg, measuring the pressure wave interaction signal at the dead end of a reservoir-pipeline-valve (RPV) configuration) in order to simplify the pressure traces that are to be detected. Unfortunately, there are many real life assessment scenarios where these simplified techniques are not applicable.

SUMMARY

In a first aspect, the present disclosure provides a method for assessing the condition of a pipeline in a pipeline system, including:

generating a pressure wave in the fluid being carried along the pipeline system at a pressure wave generating location along the pipeline system;

detecting pressure wave interaction signals at two closely spaced measurement locations along the pipeline;

determining a system response function for the pipeline based on the detected pressure wave interaction signals for each measurement location; and characterising the pipeline based on the system response function.

In another form, the method further includes:

separating the pressure wave interaction signals into two component pressure wave interaction signals for a selected measurement location, the first component pressure wave interaction signal corresponding to a first directional reflected pressure wave travelling in a first direction along the pipeline and the second component pressure wave interaction signal corresponding to a second directional reflected pressure wave travelling in an opposite direction to the first direction.

In another form, the system response function is determined based on the first and second component pressure wave interaction signals for each measurement location.

In another form, separating the pressure wave interaction signals into two component pressure wave interaction signals for the selected measurement location includes determining the transfer function of the pipeline section between the two closely spaced measurement locations.

In another form, the transfer function is determined analytically from known physical characteristics of the pipeline and the detected pressure wave interaction signals.

In another form, determining the transfer function includes measuring a further pressure wave interaction signal at a further closely spaced measurement location to provide a comparison measure.

In another form, the system response function is an impulse response function (IRF), step response function (SRF), or frequency response function (FRF).

In another form, the pressure wave is generated on one side of the closely spaced measurement locations and the pipeline is characterised on a side section located the on the other side of the closely spaced measurement locations with respect to the pressure wave generation location.

In another form, the pressure wave is generated at the same location as one of the closely spaced measurement locations and a side section located on either side of the closely spaced measurement locations is characterised.

In another form, the system response function is the FRF or the IRF for the side section.

In another form, the FRF or the IRF for the side section is determined based on a frequency transform of the component pressure wave interactions signals for the measurement location adjacent to the side section.

In another form, the system response function is a unit SRF for the side section.

In another form, determining the unit SRF includes:

defining a time dependent system input function based on the component pressure interaction signal associated with a directional reflected pressure wave moving towards the side section;

defining a time dependent system output function based on the component pressure interaction signal associated with a directional reflected pressure wave moving away from the side section; and determining the unit SRF for the side section based on solving the time dependent system output function with respect to the time dependent system input function.

In another form, characterising the pipeline on the side section includes:

dividing the side section into a plurality of discrete sub-sections;

determining the pipeline impedance for each of the plurality of sub-sections based on the unit SRF; and applying the distribution of pipeline impedances to the plurality of discrete sub-sections to determine the wave speed, length and location of each of the plurality of discrete sub-sections.

In another form, determining the pipeline impedance for each of the plurality of sub-sections based on the unit SRF includes applying the method of characteristics (MOC) to determine the pipeline impedance for each sub-section by progressing through each sub-section respectively.

In another form, the method further includes:

detecting pressure wave interaction signals at a further two closely spaced measurement locations along the pipeline, the two closely spaced measurement locations defining a first measurement station and the further two closely spaced measurement location defining a second measurement station;

separating the additional pressure wave interaction signals for the second measurement station into two component pressure wave interaction signals;

determining the system response function for the inter-station pipeline section bounded by the first and second measurement stations; and characterising the inter-station pipeline section.

In another form, determining the system response function for the inter-station pipeline section includes:

determining the transient flow rate for each of the measurement stations from the respective component pressure wave interaction signals; and determining a measured system transfer matrix for the inter-station pipeline section based on the determined flow rates and the measured pressure wave interaction signals for each measurement location.

In another form, characterising the inter-station pipeline section includes:

generating a pipeline model of the inter-station pipeline section, the pipeline model dependent on at least one parameter corresponding to a physical characteristic of the inter-station pipeline section;

calculating a proposed system transfer matrix for the pipeline model; and varying the at least one parameter of the pipeline model to minimise an objective function based on a difference related functionally to the measured system transfer matrix and the proposed system transfer matrix.

In another form, the objective function is above a minimum threshold, further including:

subdividing the pipeline model into pipeline sub-sections, each of the pipeline sub-sections dependent on at least one parameter corresponding to a physical characteristic of the respective pipeline sub-section;

calculating a modified proposed system transfer matrix for the pipeline model, the modified proposed system transfer matrix comprised of sub-system transfer matrices corresponding to each of the pipeline sub-sections;

varying the at least one parameter for each of the sub-sections of the pipeline model to minimise the objective function now based on a difference related functionally to the measured system transfer matrix and the modified proposed system transfer matrix.

In another form, characterising the inter-station pipeline section includes:

generating a pipeline model of the inter-station pipeline section, the pipeline model consisting of a plurality of sub-sections, each sub-section dependent on at least one parameter corresponding to a physical characteristic of the respective sub-section of the inter-station pipeline section;

calculating a proposed system transfer matrix for the pipeline model, the proposed system transfer matrix comprised of sub-system transfer matrices corresponding to each of the pipeline sub-sections;

varying at least one parameter for each sub-section of the pipeline model to minimise an objective function based on a difference related functionally to the measured system transfer matrix and the proposed system transfer matrix.

In another form, the physical characteristic includes:
wave speed;
wall thickness;
pipeline diameter; or
impedance.

In a second aspect, the present disclosure provides a system for assessing the condition of a pipeline in a pipeline system, including:

a pressure wave generator for generating a pressure wave in the fluid being carried along the pipeline system at a pressure wave generating location along the pipeline system;

first and second pressure measurement devices for detecting pressure wave interaction signals at two closely spaced measurement locations along the pipeline; and a data processor for:
determining a system response function for the pipeline based on the first and second detected pressure wave interaction signals for each measurement location; and
characterising the pipeline based on the system response function.

BRIEF DESCRIPTION OF DRAWINGS

Embodiments of the present disclosure will be discussed with reference to the accompanying drawings wherein.

In the following description, like reference characters designate like or corresponding parts throughout the figures.

DESCRIPTION OF EMBODIMENTS

Figure 1:
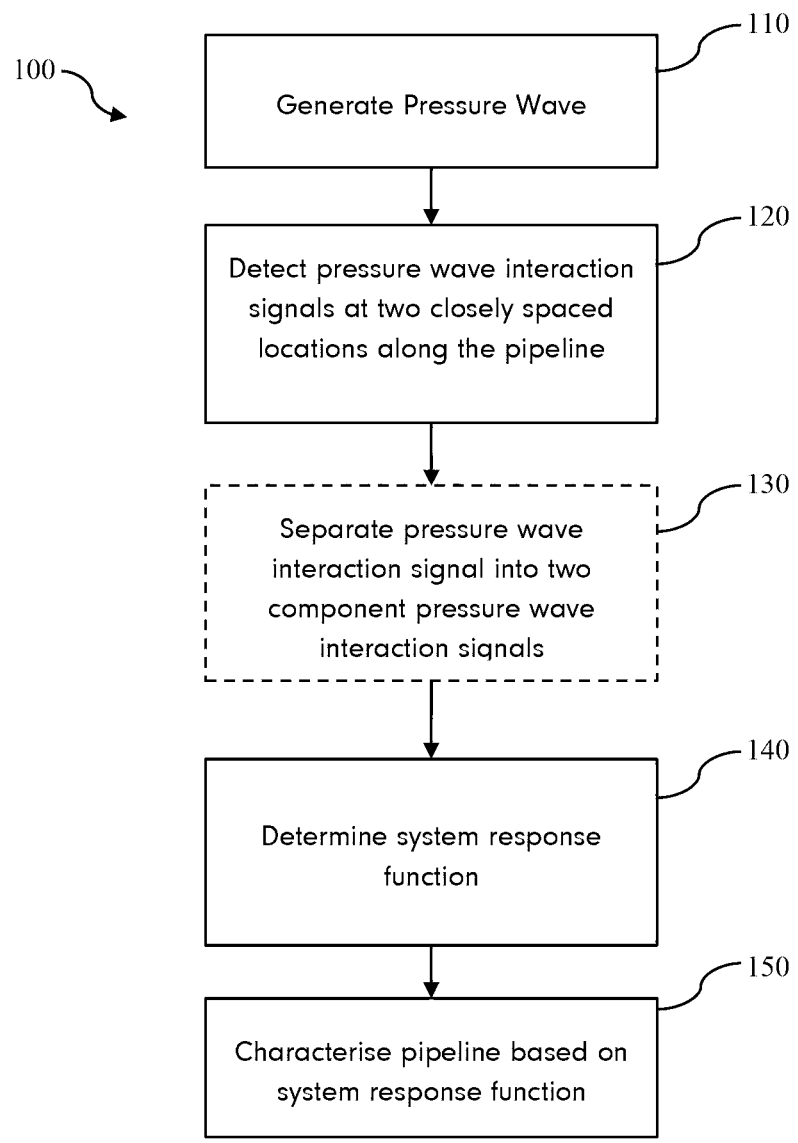
FIG. 1 is a flow chart of a method for assessing the condition of a pipeline in a pipeline system according to an illustrative embodiment.
Figure 2:
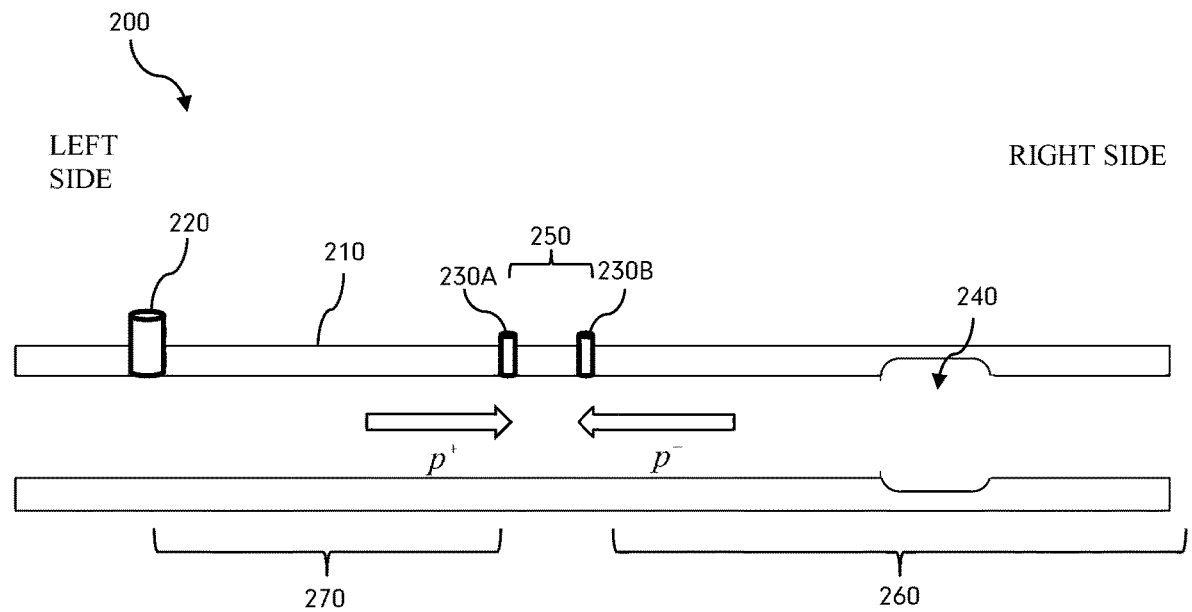
FIG. 2 is a sectional view of an example pipeline system depicting one arrangement of a pressure wave generator and associated closely spaced measurement locations according to an illustrative embodiment.

Referring now to FIG. 1, there is shown a flowchart of a method 100 for assessing the condition of a pipeline in a pipeline system according to an illustrative embodiment. Referring also to FIG. 2, there is shown a sectional view of one example of a pipeline system 200 that may be assessed in accordance with the method depicted in FIG. 1. Pipeline system 200 includes a pipeline 210 and a pressure wave generator 220 located at a generation location which in this example is to the left hand side of pipeline 210. Further along pipeline 210 are located two closely spaced pressure measurement devices 230A, 230B which are configured to measure a pressure wave interaction signal resulting from the pressure wave generated by pressure wave generator 220. Also shown in pipeline system 200 is a deteriorated section 240 which in this example corresponds to wall thinning in a localised section of pipeline 210.

The pressure wave generator 220 may be any device capable of generating a pressure wave in pipeline 210. In one example, pressure wave generator 220 is a customised discharge valve connected to an existing access point (such as an air valve or scour valve) of the pipeline system 210. A small step pressure wave (typically 5-10 meters in magnitude) may be induced by first opening the discharge valve releasing a flow until steady-state conditions are reached. As an example, for pipes ranging from 600 to 1000 mm in diameter, the amount of discharge will typically range between 20-40 L/s for steady state flow. Once the state flow state has been achieved, the discharge valve is then rapidly closed, typically within 10-50 ms. This has the effect of progressively halting the flow of fluid along the pipe that had been established as a result of the previously open discharge valve.

The generated pressure wave then propagates along the pipeline 210 in both directions from pressure wave generator 220. Other means to generate a pressure wave include, but are not limited to, inline valve closure devices and piston chambers which draw an amount of fluid into a chamber containing a piston which is then operated. In another embodiment, the pressure wave generator is capable of generating a pressure wave in accordance with a pseudo-random binary sequence such as a maximum-length binary sequence (MLBS) or an inverse-repeat binary sequence (IRS). A pressure wave generator of this type is described in Australian Provisional Application No. 2015902731, titled "SYSTEM AND METHOD FOR GENERATION OF A PRESSURE SIGNAL", filed on 10 Jul. 2015 in the name of the present Applicant, whose entire contents are incorporated by reference.

In another embodiment, the pressure wave generator may correspond to the pipeline system itself and the wideband stationary hydraulic noise generally present in the pipeline system 200. In yet other embodiments, a pressure wave generator may be configured to simulate this wideband hydraulic noise.

In this embodiment, the pressure measurement devices 230A, 230B are configured as a multi-sensor measurement unit consisting of a pair of pressure measurement devices located within 2 meters of each other at closely spaced measurement locations. It is to be understood, that additional closely spaced pressure measurement devices may also be used. Due to the close spacing between the pressure measurement devices, the inter pressure measurement device section 250 of pipeline 210 between the two pressure measurement devices 230A, 230B may be assumed as intact (eg, no deterioration) and lossless and consequently a reciprocal linear time-invariant system of which the transfer function may be estimated analytically using the theoretical properties of pipeline 210 such as the diameter, wall thickness, material mechanical properties and wall roughness. This transfer function then defines or characterises how the inter pressure measurement device section 250 of pipeline 210 modifies a travelling pressure wave.

In one example, the spacing between the two measurement locations is selected based on the bandwidth to be considered in the pressure wave separation analysis (see below) and the sampling rate of the pressure measurement. As will become apparent, the pressure wave separation analysis involves frequency domain analysis and singularities may be encountered at specific frequencies. Assuming the inter pressure measurement device section is lossless, the first singularity, other than at zero frequency, is at the frequency $f_{1s}=a_e/(2L_M)$, where $a_e$ is the wave speed in the inter pressure measurement device section and $L_M$ is the distance between the two measurement locations. If the maximum frequency of the pressure signal to be considered in the analysis is $f_e$ Hz (eg, the bandwidth considered is from 0 Hz to $f_e$ Hz), the space between the two measurement locations is selected in accordance with the condition that $f_{s1}>f_e$. It follows that the spacing between the two measurement locations will then satisfy $L_M<a_e/(2f_e)$ following this approach.

The minimum distance between the two pressure measurement devices may be selected based on the sampling frequency of measurement, $F_s$. In this approach, the minimum distance is greater than the step length of the wave propagation, which is the distance that a wave travels within one sampling interval and is given as $a_e/F_s$.

In one embodiment, the wave speed in the inter pressure measurement device section is $a_e=1000$ m/s, the maximum frequency of the pressure signal to be considered is $f_e=500$ Hz, the sampling frequency is 20 kHz, and the minimum sampling interval required for the inter pressure measurement device section is 2. As a result, the selection criteria in this example for the spacing between the two measurement locations is 0.5 m<$L_M$<1 m.

As would be apparent, depending on the requirements and configuration, the spacing between the two measurement locations may satisfy different ranges including, but not limited to, 0.5 m<$L_M$<1.5 m, 0.5 m<$L_M$<2.0 m, 0.5 m<$L_M$<2.5 m, 0.5 m<$L_M$<3.0 m, 0.5 m<$L_M$<4.0 m, 0.5 m<$L_M$<4.5 m, 0.5 m<$L_M$<5.0 m, 0.5 m<$L_M$<5.5 m, 0.5 m<$L_M$<6.0 m, 0.5 m<$L_M$<6.5 m, 0.5 m<$L_M$<7.0 m, 0.5 m<$L_M$<7.5 m, 0.5 m<$L_M$<8 m, 0.5 m<$L_M$<8.5 m, 0.5 m<$L_M$<9.0 m, 0.5 m<$L_M$<9.5 m, 0.5 m<$L_M$<10 m, 0.5 m<$L_M$<15 m, 0.5 m<$L_M$<20 m or 0.5 m<$L_M$<25 m.

In the pipeline system 200 depicted in FIG. 2, the pipe section on the right side of the closely spaced pressure measurement devices 230A, 230B, or on the opposite side of the pressure wave generation location compared to the location of the pressure measurement devices, is the assessed pipeline section 260 that is to be characterised. No assumptions are required in relation to the condition of the proximal pipeline section 270 between pressure wave generator 220 and the closest pressure measurement device 230A, ie pipeline deterioration in the proximal pipeline section 270 will not affect the assessment of assessed pipeline section 260. Condition assessment of the pipeline section on the left side of the pressure measurement devices 230A, 230B may be achieved by generating incident waves on the right side of 230B. In another embodiment, the pressure wave generator may be located at the same location as pressure measurement device 230A or 230B and in this configuration condition assessment for the pipe line sections on both sides of the closely spaced pressure measurement devices 230A, 230B may be conducted based on the generated pressure wave.

Referring again to FIG. 1, at step 110 a pressure wave is generated by a pressure wave generator such as described above.

At step 120, pressure wave interaction signals are detected at the two closely spaced measurement locations corresponding to pressure measurement devices 230A, 230B.

At step 130, each pressure wave interaction signal is separated into the two component pressure wave interaction signals corresponding to the directional reflected pressure waves travelling in opposite directions. When a pressure wave is generated by pressure wave generator 220, the incident pressure wave travels along pipeline 210 in two opposite directions. Similarly, any resulting pressure wave reflections will travel or propagate in the two opposite directions. The directional reflected pressure waves in this embodiment are defined in FIG. 2 as positive and negative waves respectively as indicated by $p^+$ and $p^-$, where $p^+$ indicates a pressure wave component travelling to the right and $p^-$ indicates a pressure wave component travelling in the opposite direction to the left.

As would be appreciated, the use of teens such as "+" and "−", "upstream" and "downstream" or "left" and "right" are used for description purposes without any loss of generality and are not intended confine the disclosure to the examples illustrated. As would be apparent, any suitable naming convention to indicate the opposite directions may be used and it would be understood that these different naming conventions would be interchangeable.

The hydraulic pressure at any single point in a pipeline, as measurable by a pressure measurement device such as a transducer can be expressed as the sum of the positive travelling pressure wave coming from the left side of the point and the negative travelling pressure wave coming from the right side of the point. Adopting this naming convention, the pressure at any point x along the pipeline can be described as $$p(x,t)=p^+(x,t)+p^-(x,t) \qquad \text{Equation 1}$$

where p(x,t) is the time-domain pressure signal as measured by a transducer, x is the distance along the pipe, t is time. Applying a Laplace transform to Equation 1 to transfer the signals into the frequency-domain, the pressure signal is then described as $$P(x,s)=P^+(x,s)+P^-(x,s) \qquad \text{Equation 2}$$

where s is the Laplace variable and the capital P represents pressure signals in the frequency domain. When the value of the Laplace variable is restricted to the positive imaginary axis, the transform is equivalent to Fourier Transform, i.e. s equals to iω, where i is the imaginary unit, and ω is the radial frequency.

Figure 3:
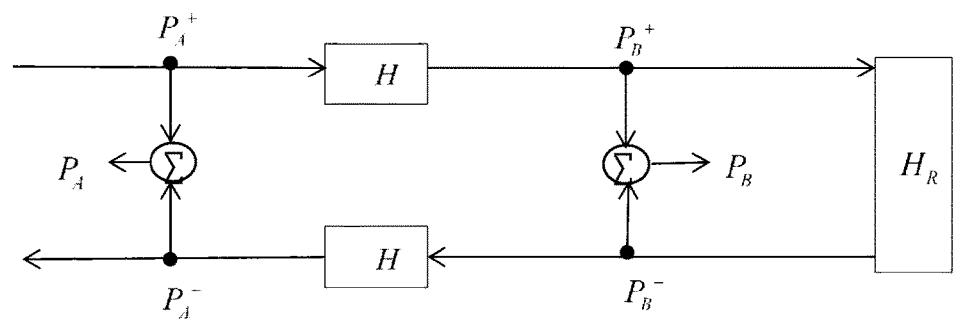
FIG. 3 is a system block diagram depicting pressure measurement using two closely spaced pressure devices as in the pipeline system illustrated in FIG. 2.

The configuration can also be described by a block diagram in the frequency domain as shown in FIG. 3, where H is the transfer function of the pipe section between pressure measurement devices 230A and 230B (assumed as a reciprocal linear time-invariant system), $H_R$ represents the system at the right side of transducer B (assumed as a linear time-invariant system), $P_A$ and $P_B$ are the measured pressure wave interaction signals at 230A and 230B respectively, $P_A^+$ and $P_A^-$ are the component pressure wave interaction signals corresponding to the positive and negative directional reflected pressure waves at location 230A respectively, and $P_B^+$ and $P_B^-$ are the component pressure wave interaction signals corresponding to the positive and negative directional reflected pressure waves at location 230B respectively.

Referring again to FIG. 3, $P_A$ and $P_B$ can be written as the sum of the positive and the negative directional reflected pressure waves based on Equation 2. The four directional reflected pressure waves for each measurement location 230A, 230B ($P_A^+$, $P_A^-$, $P_B^+$ and $P_B^-$) are related by the transfer functions H and $H_R$ under linear system theory. As a result, $P_A$ and $P_B$ can be described by $P_A^+$ (the incident wave entering the system) and the transfer functions in the frequency domain and written as $$P_A=P_A^++P_A^+H^2H_R \qquad \text{Equation 3}$$

and $$P_B=P_A^+H+P_A^+HH_R \qquad \text{Equation 4}$$

Multiplying Equation 4 by H and then subtracting Equation 3, the dependence on $H_R$ is eliminated and the result is $$P_BH-P_A=P_A^+H^2-P_A^+ \qquad \text{Equation 5}$$

Rearranging Equation 5 gives a description of $P_A^+$ as $$P_A^+ = \frac{P_A - P_BH}{1 - H^2} \qquad \text{Equation 6}$$

The other component pressure wave interaction signals corresponding to the other directional reflected pressure wave may also be obtained in a similar procedure.

In Equation 6, $P_A$ and $P_B$ are obtained by applying a Laplace or Fourier transform to the original pressure wave interaction signals. The transfer function H for the inter pressure measurement device section between the two closely spaced measurement locations can then be determined analytically from known characteristics of the pipeline or in an alternative embodiment by empirical determination.

In the case of analytical determination, if the inter pressure measurement device section between the two closely spaced measurement locations is assumed lossless (which is a reasonable assumption when the section of pipe is very short, eg. of the order of a few metres, and does not have significant deterioration, eg, a blockage), then it will only introduce a time delay and h(t) can be described as $$h(t) = \delta(t - \Delta t) \quad \text{Equation 7}$$

where δ is the Dirac Delta function. The frequency domain counterpart is $$H(iw) = e^{-i(t)\Delta t} \quad \text{Equation 8}$$

If signal dissipation and/or dispersion, which can be frequency-dependent, is considered for the short pipe section between the two pressure measurement devices is uniform, h(t) will be complicated. However, adopting the principle of complex wave speed to describe signal dissipation and dispersion in general, H(iw) can be described as $$H(iw) = e^{-iL_M/a_e} \quad \text{Equation 9}$$

where $a_e$ is the complex and frequency dependent wave speed which can be described as $$a_e = a_r + i a_i \quad \text{Equation 10}$$

where $a_r$ and $a_i$ represent the real part and the imaginary part respectively. Substituting Equation 10 into Equation (9), H(iw) can be expressed as $$H(iw) = e^{-\omega \alpha L_M} e^{-i\omega L_M / a_e} \quad \text{Equation 11}$$

where $$\alpha = \frac{a_i}{|a_c|^2} \quad \text{Equation 12}$$

is the attenuation factor and $$a_e = \frac{|a_c|^2}{a_r} \quad \text{Equation 13}$$

is the equivalent wave speed.

In theory, the complex and frequency dependent wave speed $a_e$ can be estimated using numerical models that describe the friction resistance and viscoelasticity in pipelines. In practice, using a discrete incident wave with a sharp wave front and a short duration, the transfer function can be determined in the time domain using $$h(t) = p_{iB}(t) * p_{iA}^{-1}(t) \quad \text{Equation 14}$$

and in the frequency domain using $$H(i\omega) = P_{iB}(i\omega) / P_{iA}(i\omega) \quad \text{Equation 15}$$

Note that there are other signal processing algorithms available for the determination of h(t) from $p_{iA}(t)$ and $p_{iB}(t)$ based on theory and methods for system identification of linear systems. As described previously, once H has been determined, then the component pressure wave interaction signals may be determined.

In another embodiment, an additional pressure measurement device is employed to empirically determine H by an optimisation approach.

Figure 4:
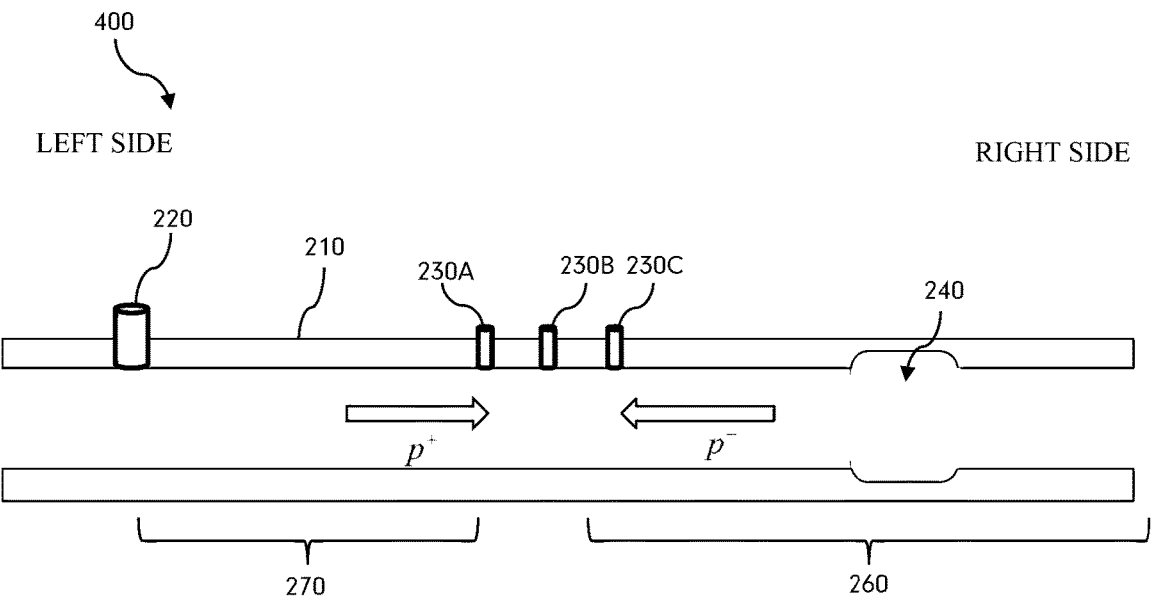
FIG. 4 is a sectional view of the pipeline system illustrated in FIG. 2 employing three closely equally spaced measurement locations according to an illustrative embodiment.

An alternative is to determine the transfer function using three or more sensors with an optimisation approach. Referring now to FIG. 4, there is shown pipeline system 400 employing three equally spaced pressure measurement devices at closely spaced measurement locations 230A, 230B, 230C. Pipeline system 400 is essentially equivalent to pipeline system 200 except with the addition of further pressure measurement device 230C which in this embodiment is spaced substantially equally from 230A, 230B to provide a comparison measure.

A potential source of uncertainty in the analytical wave separation method involving a calculated transfer function H may arise if there is measurement inaccuracy due to differences in sensitivity between the two pressure measurement devices. In this case, a third pressure measurement device 230C may be introduced to facilitate the empirical calculation of H and undertake the wave separation as depicted in FIG. 4.

In this approach, the transfer function H for the pipeline section between two sensors can be expressed mathematically as:

$$H = e^{-\Gamma(s) L_M} \quad \text{Equation 16}$$

where Γ(s) is the propagation operator that describes the frequency dependent attenuation and phase change per unit length. Γ(s) is a complex function of s that is independent of $L_M$. Γ(s) can be expressed in a general form by:

$$\Gamma(s) = \frac{1}{a}\sqrt{[s + R(s)][s + C(s)]} \quad \text{Equation 17}$$

where a is the wave speed, R(s) and C(s) represent the resistance and compliance terms respectively. If only steady friction and elastic pipes are considered, C(s)=0, and R is given by:

$$R = \frac{f\bar{q}}{DA} \quad \text{Equation 18}$$

where f is the Darcy-Weisbach friction factor, $\bar{q}$ is the steady-state flow, D is the diameter of pipe, and A is the cross-sectional area of pipe. When the effects of unsteady friction, and/or pipe wall viscosity in viscoelastic pipes are considered, R(s) and C(s) will have different expressions. If the values of the relevant parameters, i.e. a, R(s) and C(s) are known, the transfer function may be directly obtained from Equation 16. However, in real pipelines, accurate values of those parameters may not necessarily be known and in an alternative embodiment may be determined by empirical measurement as follows.

As discussed above, a third pressure measuring device may be used to assist in determining the transfer function H. In the measurement scenario depicted in FIG. 4, the distance between 230A and 230B is equal to the distance between 230B and 230C, therefore, it can be assumed that the transfer function between 230B and 230C is similarly equal to H. $P_B^+$ can be obtained from the pressure measurement devices 230A and 230B by using the two transducer-based wave separation method and is written as $$P_B^+|_{AB} = \frac{P_A H - P_B H^2}{1 - H^2} \quad \text{Equation 19}$$

Similarly, using pressure measurement devices 230B and 230C, $P_B^+$ can be expressed as $$P_B^+|_{BC} = \frac{P_B - P_C H}{1 - H^2} \quad \text{Equation 20}$$

Equations 19 and 20 provide two separate expressions for $P_B^+$ which may be used to reduce any inaccuracy that might arise in the measurement of the pressure wave interaction signals. Consider $P_A$, $P_B$ and $P_C$ to be the 'true' pressures that theoretically should be measured at the locations 230A, 230B and 230C. Assuming that $M_A$, $M_B$ and $M_C$ are the pressures actually measured at points 230A, 230B and 230C, and $M_B$ is the 'true' pressure at point 230B (although unknown gain error may be involved) then the true pressure at point A, B and C may be expressed as $$P_A = \alpha_A M_A, \; P_B = M_B, \; P_C = \alpha_C M_C, \quad \text{Equation 21}$$

where $\alpha_A$ and $\alpha_C$ are the scale factors for the measurements at A and B respectively. As a result, the directional travelling wave $P_B^+$ as shown in Equations 19 and 20 is a function of θ, where θ=[ω, $\alpha_A$, $\alpha_C$, a, R, C] is a vector of the frequency, the scale factors and the system parameters.

A function that represents the difference between Equations 19 and 20 may then be defined by the least-squares criterion as follows:

$$E(\theta, \omega) = \sum_{\omega=\omega_0}^{\omega_N} (P_B^+(\theta, \omega)|_{AB} - P_B^+(\theta, \omega)|_{BC})^2 \quad \text{Equation 22}$$

where $\omega_0$ to $\omega_N$ are the measured discrete frequencies. This then becomes a parameter estimation problem, which is solved by finding the optimum parameter vector $\hat{\theta}$ from the set of feasible solutions Θ through minimising the objective function E(θ), ie $$\hat{\theta} = \arg\min_{\theta \in \Theta} E(\theta) \quad \text{Equation 23}$$

Once the optimum parameter vector $\hat{\theta}$ is obtained, the transfer function H can be determined from Equation 16 using the values of a, R and C determined by the optimisation process.

The calibration can also be conducted when the three measurement locations have known spacing distances but not equal. Referring to Equation 16, the transfer function for the short section between the first sensor and the second sensor, and that for the section between the second sensor and the third sensor have the same Γ(s) but in this case different $L_M$.

Further information about wave separation and associated numerical studies may be found in Gong, J., Lambert, M. F., Simpson, A. R., and Zecchin, A. C. (2012), "Distributed deterioration detection in single pipelines using transient measurements from pressure transducer pairs", *Proceedings of the 11th International Conference on Pressure Surges*, BHR Group, Cranfield, UK, 127-140; and Gong, J., Zecchin, A. C., Lambert, M. F., and Simpson, A. R. (2012). "Signal separation for transient wave reflections in single pipelines using inverse filters", *Proceedings of the World Environmental & Water Resources Congress* 2012, ASCE, Reston, Va., 3275-3284, the contents of both of these documents incorporated by reference in this entirety.

Figure 5:
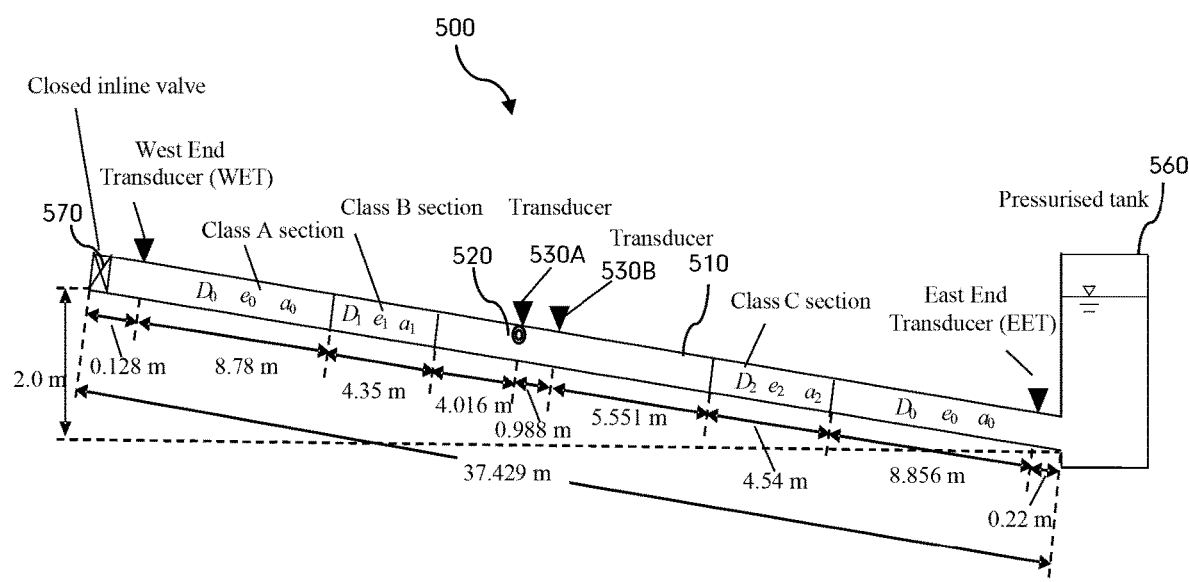
FIG. 5 is a sectional view of an example pipeline system depicting an arrangement of a pressure wave generator and associated closely spaced measurement locations according to another illustrative embodiment.

Referring now to FIG. 5, there is shown a pipeline system 500 employed by the Applicant for testing the wave separation algorithm referred to above in verification studies. In this example, pipeline system 500 is a reservoir-pipeline-valve (RPV) system. Pipeline 510 is a one-inch copper pipe with a total length of approximately 37.5 m and bounded by two pressurised tanks. Either of the pressurised tanks can be isolated by an in-line valve to make the system a reservoir-pipeline-valve configuration. The majority of pipeline is Class A copper pipe with two short pipe sections of Class B and Class C. These two short pipe sections have thinner wall thicknesses and are placed in pipeline system 500 to simulate pipe sections with wall deterioration. The length information of each pipe section is given in FIG. 5 and other physical details are provided in Table 1. The pressure head in the pressurised tank 560 is controlled at approximately 31 m during the experimental studies. The in-line valve 570 at the other end pipeline 510 was kept closed during the studies.

A pressure wave generator 520 in the form of a solenoid side-discharge valve is used to generate the pressure wave and in this setup is located at the same location as pressure measurement device 530A. The other pressure measurement device 530B is located upstream (on the right) of the pressure wave generator 520 and pressure measurement device 530A with a distance of $L_M$=0.988 m between the two pressure measurement devices. A step pressure wave was generated by abruptly closing (approximately 2 to 3 ms) the solenoid valve of pressure wave generator 520 and the pressure wave interaction signals were measured by the two pressure measurement devices 530A, 530B. The sampling frequency used for the pressure measurement was 20 kHz. The aim of the verification study is to separate the directional reflected pressure wave travelling upstream and that travelling downstream using the pressure wave interaction signals measured by the two pressure measurement devices.

TABLE 1

Physical details of the pipe sections used in the experiment studies illustrated in FIG. 5.

| Pipe Class | Internal diameter (mm) | Wall thickness (mm) |
|---|---|---|
| A | $D_0$ = 22.14 | $e_0$ = 1.63 |
| B | $D_1$ = 22.96 | $e_1$ = 1.22 |
| C | $D_2$ = 23.58 | $e_2$ = 0.91 |

Figure 6:
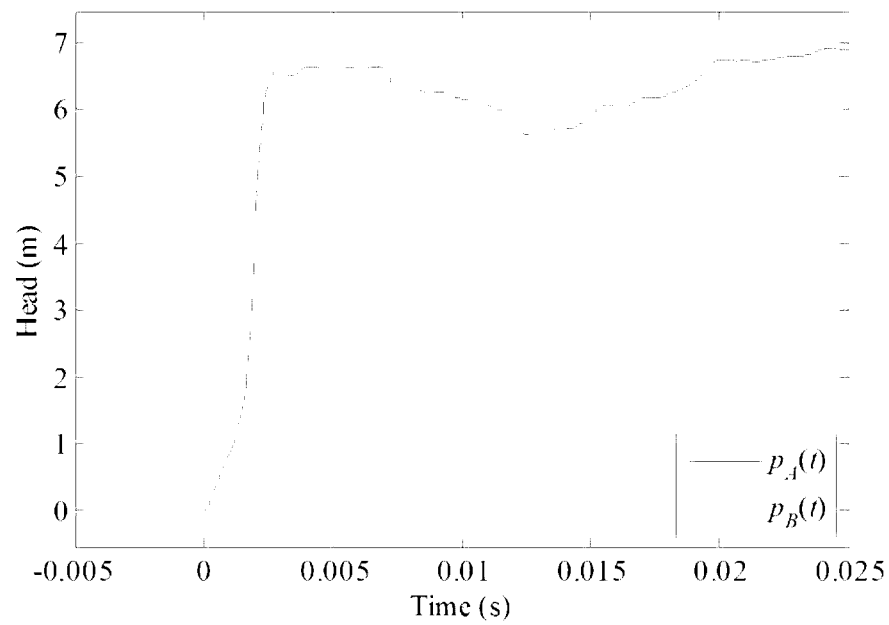
FIG. 6 is a plot of the pressure wave interaction signals (in format of pressure head with units of meters of water) measured by the two closely spaced pressure measurement devices (0.988 m) for the pipeline system illustrated in FIG. 5.

Referring now to FIG. 6, there is shown a plot of the original head fluctuations (relative to the steady-state head) as measured by the two pressure measurement devices 530A, 530B illustrated in FIG. 5. The steady-state head is determined by averaging a period of measurement before the incident wave and subtracted from the raw measurements. The start time of the incident wave is set to zero, and the pressure traces or pressure wave interaction signals are truncated before the boundary reflections (the reflection from the tank and the closed in-line valve). It can be seen that the reflections from the Class B and Class C pipe sections are superimposed in the two measured traces, resulting in complex reflections that would typically be difficult to interpret.

It can be seen from FIG. 6 that the incident wave as measured at 530B (the dotted line) has a magnitude slightly greater than that measured at 530A (the solid line). This difference cannot be reasonably explained by losses because 530A is where the generator was located and the greatest incident wave is expected to see. As a result, this difference is believed to relate to measurement error (including error in the estimation of the steady-state head) and inconsistency between pressure measurement devices.

Figure 7:
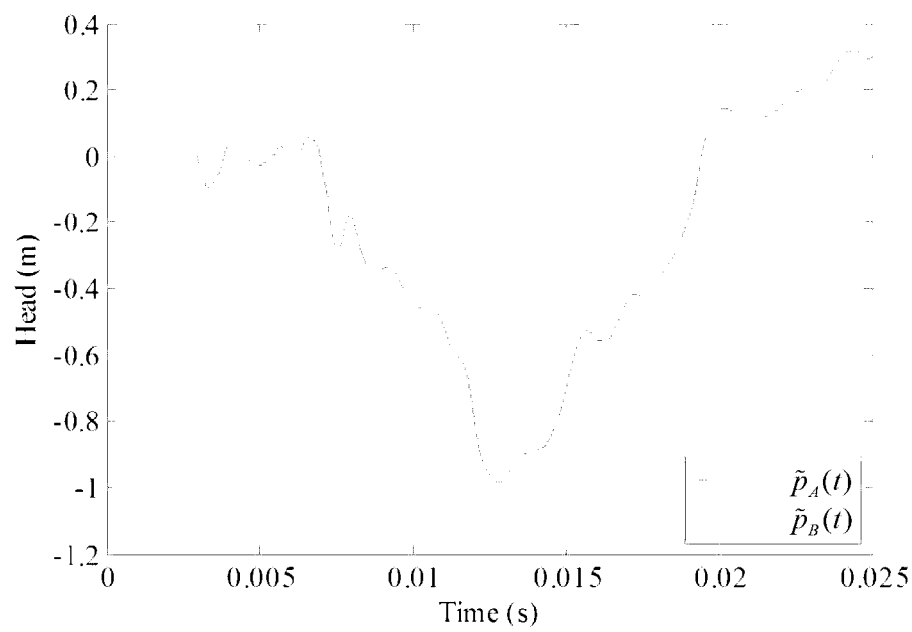
FIG. 7 is as an enlarged and scaled plot of the pressure wave interaction signals illustrated in FIG. 6 depicting the pressure wave reflections measured by the two pressure measurement devices illustrated in FIG. 5.

The head fluctuation measured by 530B is scaled to make the size of the incident wave the same as that measured at 530A. The pressure wave reflections are isolated and shown in FIG. 7 which shows the pressure wave interaction signals measured by the two pressure measurement devices. The time for the incident wave to travel from 530A to 530B is determined as $\Delta t = 0.75$ ms from correlation analysis. The equivalent wave speed in the short pipe section between the two transducers, neglecting frequency-dependent effects, is determined as $a_e = a_0 = 1319$ m/s. Because the scaling process was adopted, signal attenuation was not determined. As a result, the lossless condition is assumed for the pipeline section between the two pressure measurement devices, ie, only the time delay is considered and Equation 8 is used for the transfer function. Considering the length of this section is just $L_M = 0.988$ m and the copper pipe is smooth, this assumption is reasonable.

Figure 8:
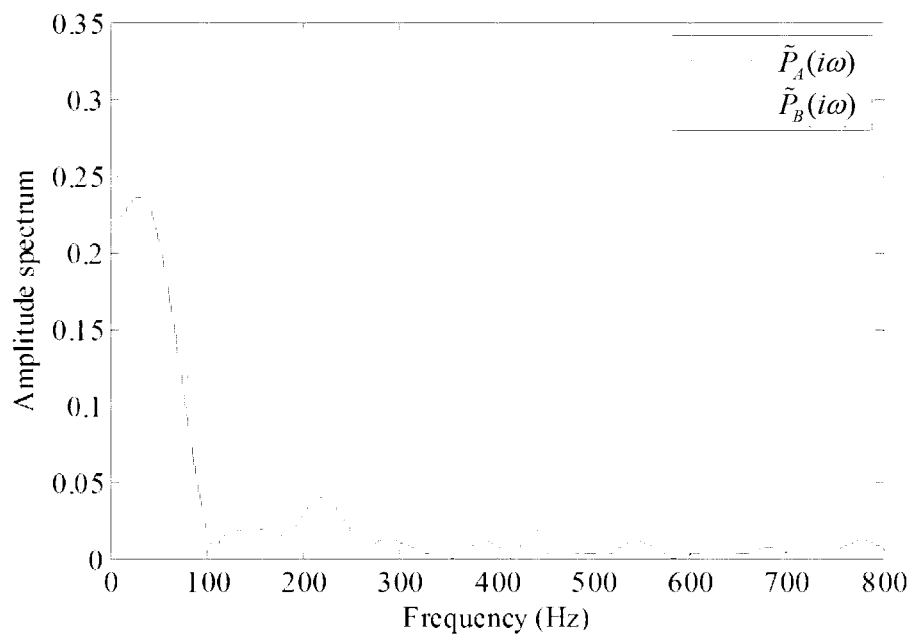
FIG. 8 is a plot of the amplitude spectrum of the pressure wave interaction signals illustrated in FIG. 6.

Considering again Equation 6, the first non-zero frequency that will introduce a singularity (ie. where the denominator of Equation 6 is zero) is $f_{s1} = 667$ Hz. The amplitude spectrum of the measured reflections is then determined to investigate the effective frequency range, as shown in FIG. 8 which shows the amplitude spectrum of the pressure wave interaction signals measured by pressure measurement devices 530A, 530B. The upper bound of the effective frequency range is determined as $f_e = 600$ Hz. Because $f_e < f_{s1}$, the singularity would not appear provided the wave separation is only implemented for the frequencies up to $f_e$.

Figure 9:
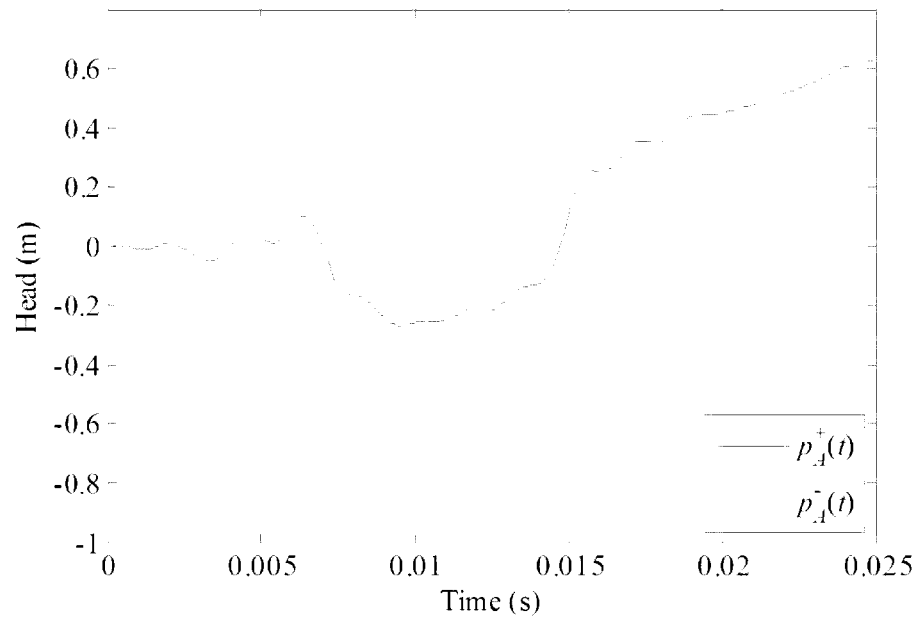
FIG. 9 is a plot of the component pressure wave interaction signals corresponding to the directional reflected pressure waves for the pressure measurement devices located at "A" obtained from wave separation analysis according to an illustrative embodiment.
Figure 10:
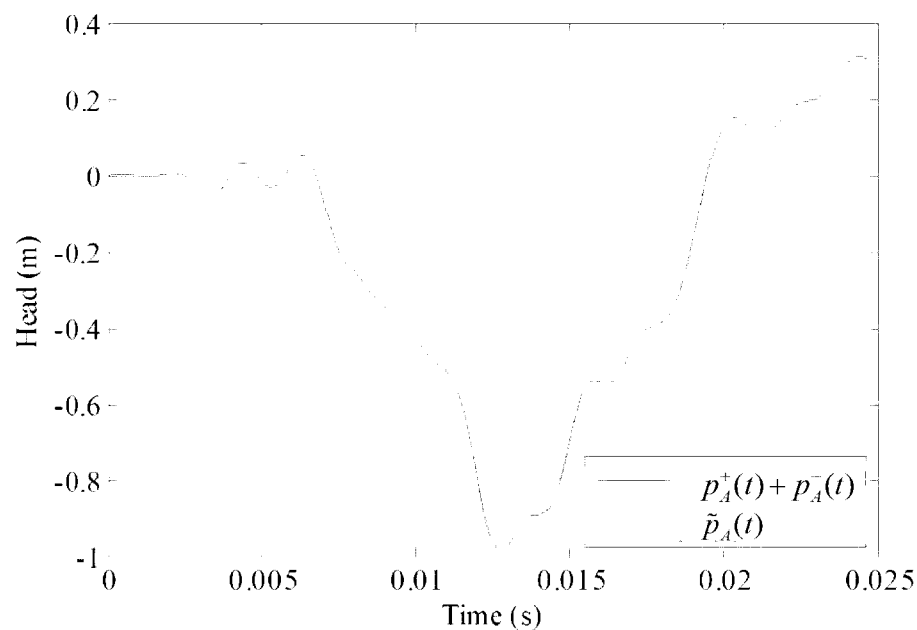
FIG. 10 is a plot of a comparison between the reconstructed component signals [$p_A^+(t)$ and $p_A^-(t)$] illustrated in FIG. 9 and the original pressure reflection trace illustrated in FIG. 7.

Next the negative (travelling to the left of 530A) and the positive (travelling to the right of 530B) travelling pressure waves $p_A^-(t)$ and $p_A^+(t)$ are determined by Equation 6 and equivalents for frequencies up to 600 Hz. The results are given in FIG. 9 which shows the directional reflected pressure waves obtained from the wave separation analysis. It can be seen that in the directional reflected pressure waves that reflections from the two thinner-walled sections are separated. The superimposed pressure wave interaction signal is reconstructed by adding $p_A^+(t)$ and $p_A^-(t)$ together and compared with the original measured wave reflection $\tilde{p}_A(t)$ in FIG. 10 which shows the comparison between the reconstructed wave reflection [$p_A^+(t)$ and $p_A^-(t)$] and the original pressure reflection wave interaction signal [$\tilde{p}_A(t)$].

As is apparent, the reconstructed pressure wave interaction signal for pressure measurement device 530A is generally consistent with the original measured pressure wave interaction signal, with small differences due to the exclusion of the frequency components above 600 Hz in the wave separation. This confirms that separation of directional travelling pressure waves may be carried out in pipelines testing configurations that employ two pressure measurement devices in close proximity.

Referring again to FIG. 1, at step 140 the system response function for pipeline system 200 is determined.

The system response function represents how any system responds to an input and is directly related to the physical characteristics of the system. Example system response functions include the impulse response function (IRF) and the step response function (SRF) in the time domain and the frequency response function (FRF) in the frequency domain. In the case of a pipeline system, the system response function characterises the pipeline's pressure response to an incident pressure wave and once determined may be employed for pipeline condition assessment, i.e. to determine the physical properties of the pipeline.

Following wave separation at step 130, the system response function may be determined. As depicted in FIG. 3, $H_R$ is the system response function for the pipeline system 200 on the right of the closely spaced pressure measurement devices 230A, 230B as illustrated in FIG. 2 which describes the relationship between $P_B^+$ and $P_B^-$ under linear system theory.

In the frequency domain (Laplace domain), $H_R$ is the FRF and the relationship can be described as $$P_B^-(s) = H_R(s) P_B^+(s) \qquad \text{Equation 24}$$

As a result, the system response function of the pipeline section on the right of the closely spaced pressure measurement devices 230A, 230B may be determined from the component pressure wave interaction signals corresponding to the directional reflected pressure waves.

If the pressure wave generator is located at the same location as pressure measurement devices 230A or 230B, the pipeline sections on each side may be treated as two linear systems. The system response function for these two sections may then be determined from the two directional waves $p^+$ and $p^-$. For the section on the left side of the multi-sensor unit, $p^-$ is the input and $p^+$ is the output; for the section on the right side, $p^+$ is the input and $p^-$ is the output.

The pipeline system response function can also be determined by other system identification techniques for linear systems using the known input and output signals as are known in the art.

In another embodiment, the pipeline system response function may be determined from the measurements obtained from the two closely spaced sensors without explicitly determine the directional travelling waves. In this embodiment, step 130 of the method depicted in FIG. 1 is not required.

Referring again to Equation 19, in the frequency domain, the positive directional wave at location 'B', $P_B^+(s)$, can be expressed in terms of the two original pressure measurements $P_A(s)$ and $P_B(s)$, and the transfer function of the inter pressure measurement device section, $H(s)$. Similarly, using the relationship described in FIG. 3, the negative directional wave at location 'B', $P_B^-(s)$, can also be expressed in terms of the two original pressure measurements $P_A(s)$ and $P_B(s)$, and the transfer function of the inter pressure measurement device section, $H(s)$. Now referring to Equation 24, the frequency response of the side pipe section on the opposite site of the generator location, $H_R(s)$, can then be expressed in terms of the two original pressure measurements $P_A(s)$ and $P_B(s)$, and the transfer function of the inter pressure measurement device section, $H(s)$. As a result, in this example, the determination of the frequency response of the side pipe section, $H_R(s)$, can be carried out without explicitly separating the component pressure wave interaction signal.

An application of this approach where the generated pressure wave is wideband and stationary, can be found in Zecchin, A. C., Gong, J., Simpson, A. R. & Lambert, M. F. (2014) "Condition assessment in hydraulically noisy pipeline systems using a pressure wave splitting method", *Procedia Engineering*, 89, 1336-1342, the content of which is incorporated by reference in its entirety.

Referring again to FIG. 1, at step 150 the pipeline is characterised based on the derived system response function. In one example, an inverse transient analysis (ITA) type approach may be adopted, either in the time domain or in the frequency domain to find an optimal numerical pipeline model to match the simulated response with the measured response. In the time domain, the simulated response to match may be the IRF, SRF or the pressure response to any specific and known incident wave. In the frequency domain, the response to match can be the FRF.

In one example embodiment, the pipeline is characterised employing a reconstructive transient analysis (RTA) which determines the pipeline properties reach by reach through calculating the characteristic equations (as defined in the method of characteristics) backward in time along the characteristic lines. Compared to a previous study reported in Gong, J., Lambert, M. F., Simpson, A. R. and Zecchin, A. C. (2014). "Detection of localized deterioration distributed along single pipelines by reconstructive MOC analysis." *J Hydraulic Eng*, 140(2), 190-198, the RTA only uses the SRF for the pressure response, and does not need any transient flow information of the pipeline system. As a result, the RTA can be applied to any pipe section with a known SRF in a pipeline system (eg, not limited to sections with a dead end where the flow is always zero).

Figure 11:
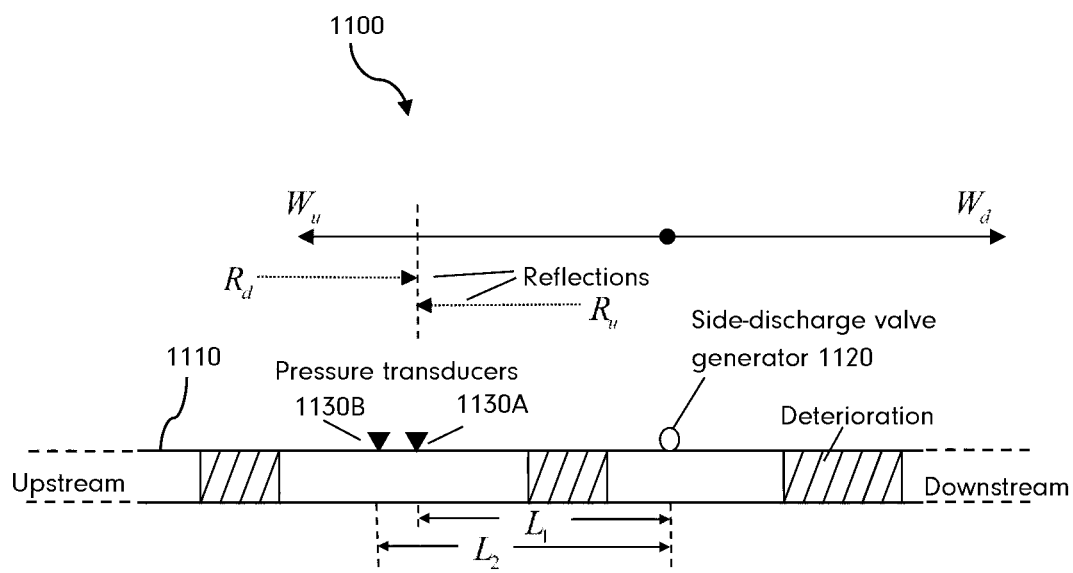
FIG. 11 is a sectional view of a pipeline system depicting another arrangement of a pressure wave generator and associated closely spaced measurement locations according to an illustrative embodiment also depicting directional reflected pressure waves $R_u$ and $R_d$ travelling upstream and downstream respectively with respect to the closely spaced pressure measurement devices.

Referring now to FIG. 11, there is shown a pipeline system 1100 according to a further illustrative embodiment which is used to illustrate the RTA approach. As previously, a pressure wave generator 1120 in the form of a side-discharge valve is used to generate a steep incident pressure wave that propagates both upstream and downstream simultaneously ($W_u$ and $W_d$) by shutting off a discharge valve abruptly. Two pressure measurement devices in the form of pressure transducers (1130A and 1130B) are located in close proximity to one another on one side of generator 1120, either upstream or downstream. In the example illustrated in FIG. 11, pressure measurement devices 1130A, 1130B are located upstream of pressure wave generator 1120 and this configuration is used throughout the ongoing description related to this embodiment without loss of generality. The distance between pressure measurement device 1130A and pressure wave generator 1120 and that between pressure measurement device 1130B and pressure wave generator 1130 are represented by $L_1$ and $L_2$, respectively.

In this example, the two boundaries of the pipeline are far away from the pressure measurement devices 1130A, 1130B and the pressure wave generator 1120 and as a consequence reflections from boundaries are not considered. There are no constraints on the type of boundary condition, but a steady state is required before the generation of the transient excitation. After the excitation, directional reflected pressure waves emanating from the deteriorated sections travel upstream or downstream along the pipeline ($R_u$ and $R_d$). The pressure measurement devices 1130A, 1130B measure the magnitude change of pressure at specific locations (ie, the pressure wave interaction signal) which is the superposition of the incident wave and the two directional reflected pressure waves.

The two paired pressure measurement devices 1130A, 1130B are located in the vicinity of each other such that the inter device section of pipe in between may be assumed to be intact as previously described. In this embodiment, the selection of the spacing between two measurement locations $L_M$ may be based on the bandwidth to be considered in the wave separation analysis and the sampling rate of the pressure measurement. Following this approach, the criteria can be described as $Na/F_s < L_M < a/(2f_e)$, where N is the number of sampling points during the time interval for a pressure wave to traveling from one measurement location to another, a is the wave speed, $F_s$ is the sampling frequency and $f_e$ is the maximum frequency of interest.

The minimum distance between the two paired pressure measurement devices in this embodiment depends on the step length of the wave propagation, which is the distance that a wave travels within one sampling interval and is given as $a/F_s$. Numerical simulations show that the distance between the two paired pressure measurement devices may be as small as 1 m (eg, twice the step length of the wave propagation) when the sampling frequency $F_s$=2 kHz and the wave speed a=1000 m/s ($a/F_s$=0.5 m). The frequencies can be analysed in this embodiment is up to 500 Hz [eg, $a/(2L_M)$].

The pressure wave interaction signal measured by a single pressure measurement device is a superposition of all traveling waves and as such it can be very complex when reflections occur from multiple deteriorated sections in the pipeline. In line with step 130 of FIG. 1, in order to reduce the complexity of the signal and facilitate interpretation of the data, the measured composite pressure wave interaction signal is separated into its individual components, including the incident wave ($W_u$), the reflected wave travelling upstream ($R_u$), and the wave travelling downstream ($R_d$) with respect to the location of the pressure measurement device. The reflected waves $R_u$ and $R_d$ are referred to as directional reflected pressure waves. To achieve the decomposition and obtain the individual directional reflected pressure wave corresponding to a particular direction the following method is adopted.

The pressure wave interaction signals measured at the pressure measuring device 1130A, 1130B include two reflected wave component signals $R_u(t)$ and $R_d(t)$. The measured pressure wave interaction signals can be denoted as $$H_1(t) = \begin{cases} H_0 & 0 \le t < t_0 + t_1 & \text{Equation 25a} \\ H_i + R_u(t) + R_d(t) & t \ge t_0 + t_1 & \text{Equation 25b} \end{cases}$$

and as $$H_2(t) = \begin{cases} H_0 & 0 \le t < t_0 + t_2 & \text{Equation 26a} \\ H_i + R_u(t - \Delta t) + R_d(t + \Delta t) & t \ge t_0 + t_2 & \text{Equation 26b} \end{cases}$$

respectively, in which t represents time; $t_0$ is the time point when the incident wave is generated; $t_1 = L_1/a$ and $t_2 = L_2/a$; and $\Delta t = t_2 - t_1$.

Because the two paired closely spaced pressure measurement devices are close to each other, the steady-state head, and the head of the incident wave, which they measure are assumed to be the same, and are denoted as $H_0$ and $H_1$ respectively in Equations 25 and 26. $R_u(t)$ and $R_d(t)$ represent the component pressure wave interaction signals corresponding to the directional reflected pressure waves traveling upstream and downstream from pressure measurement device 1130A. Note that $R_u(t) = R_d(t) = 0$ when $t < t_0 + t_1$. The two component pressure wave interaction signals $R_u(t)$ and $R_d(t)$ corresponding to the directional reflected pressure waves $R_u$ and $R_d$ are then obtained from the measured pressure wave interaction signals $H_1(t)$ and $H_2(t)$. Accordingly, the component pressure wave interaction signal $R_d(t)$ is then determined in accordance with the following method.

An intermediate pressure signal $P_d(t)$ that only depends on $R_d(t)$ can be obtained from the two measured pressure wave interaction signals. Firstly, the time-domain trace of $H_2(t)$ is moved forward in time by an interval of $\Delta t$, which may be achieved by substituting t by $t + \Delta t$ in Equation 26, where the result becomes $$H_2(t + \Delta t) = \begin{cases} H_0 & -\Delta t \le t < t_0 + t_1 & \text{Equation 27a} \\ H_i + R_u(t) + R_d(t + 2\Delta t) & t \ge t_0 + t_1 & \text{Equation 27b} \end{cases}$$

Subtracting $H_1(t)$ from $H_2(t+\Delta t)$ yields the intermediate signal as $$P_d(t)=H_2(t+\Delta t)-H_1(t)=R_d(t+2\Delta t)-R_d(t) \quad t \geq t_0+t_1 \qquad \text{Equation 28}$$

Using the signal $P_d(t)$ the component pressure wave interaction signal $R_d(t)$ can be derived. A Fourier transform $F[\ ]$ is applied to $P_d(t)$, which can be described as $$F[P_d(t)]=(e^{j\omega 2\Delta t}-1)F[R_d(t)] \quad t \geq t_0+t_1 \qquad \text{Equation 29}$$

where j is the imaginary unit $\sqrt{-1}$; and $\omega$ is angular frequency. Rearranging Equation 29 results in $$R_d(t)=F^{-1}[\Phi(\omega)F[P_d(t)]] \quad t \geq t_0+t_1 \qquad \text{Equation 30}$$

where $F^{-1}[\ ]$ represents the inverse Fourier transform and $\Phi(\omega)=1/(e^{j\omega 2\Delta t})$. The procedure for deriving $R_u(t)$ is analogous.

As would be appreciated, compared with the measured pressure wave interaction signals, the complexity in the component pressure wave interaction signals $R_u(t)$ and $R_d(t)$ corresponding to the directional reflected pressure waves is significantly reduced. The two directional reflected pressure waves are coupled with one another. For example, $R_d(t)$ represents the reflections travelling downstream with regard to the location of pressure measuring device 1130A. These reflections emanate from the deterioration upstream of pressure measuring device 1130A, but they are induced by not only the initial incident wave $W_u$, but also the wave $R_u(t)$ that travels upstream. Similarly, $R_u(t)$ is related to both $W_d$ and $R_d(t)$.

In line with step 140 of FIG. 1, to remove the coupling and facilitate the identification of distributed deterioration for the pipe section upstream from the pair of transducers, the unit step response function (SRF) of this pipe section is determined, which represents reflections emanating from the deterioration upstream of the transducers, and only induced by a step pressure wave with a magnitude of unity. In the unit SRF of the upstream section, the effects of the section of pipe downstream are totally removed. As a result, the wave reflections shown in the unit SRF can be directly attributed to their source upstream from the pair of transducers. The procedure for determining the unit SRF in this embodiment is now described.

The unit step response function (SRF) of a linear system can be derived once both the input and output of this system are known. For the pipeline system illustrated in FIG. 11 and as discussed in the previous sections, once the component pressure wave interaction signals $R_u(t)$ and $R_d(t)$ are obtained, the input and the output for the pipe section upstream from the pair of pressure measurement devices 1130A, 1130B are determined. Because the steady-state head $H_0$ is arbitrarily selected and has no effect on the wave reflection, the input signal can be defined as $R_u(t)+(H_t-H_0)$ and the corresponding output is simply $R_d(t)$.

The unit SRF can be obtained from the impulse response function (IRF), which can be obtained from the input and output signals through system identification as described in Equations 14 and 15. In this example, the determination of IRF is based on a correlation analysis of the input and output signals. Only the first few seconds of the unit SRF are used, which covers the length of the pipe section of interest.

As would be appreciated, the SRF of the pipe section downstream from the pair of pressure measurement devices 1130A, 1130B may be difficult to determine as the input for this sub-system is implicit since the incident pressure wave is generated at an interior point in this section of pipeline. In practice, pressure wave generator 1120 can simply be relocated to a point upstream from the pair of pressure measurement devices 1130A, 1130B and then the procedures presented previously adapted to estimate the SRF of the downstream section on the other side of pressure measurement devices 1130A, 1130B. In the unit SRF of the pipe section upstream from the pair of transducers, the transient response of the deterioration is significantly simplified because the effects of the deterioration downstream are removed; however, higher order multiple reflections between the deteriorated reaches in this section of pipe still exist in the SRF.

In line with step 150 of FIG. 1, once the unit SRF has been determined a reconstructive transient analysis (RTA) is carried out to characterise the pipeline section. Before discussing the RTA process, the behaviour of a transient wave crossing the boundary of a deteriorated section should be considered. The deteriorated section is a pipeline section giving rise to a change in the pipeline impedance which is defined as $$B = \frac{a}{gA} \qquad \text{Equation 31}$$

where B represents the impedance of the section of pipeline; g is gravitational acceleration; a is the wave speed and A denotes the cross-sectional area of the pipeline.

Figure 12:
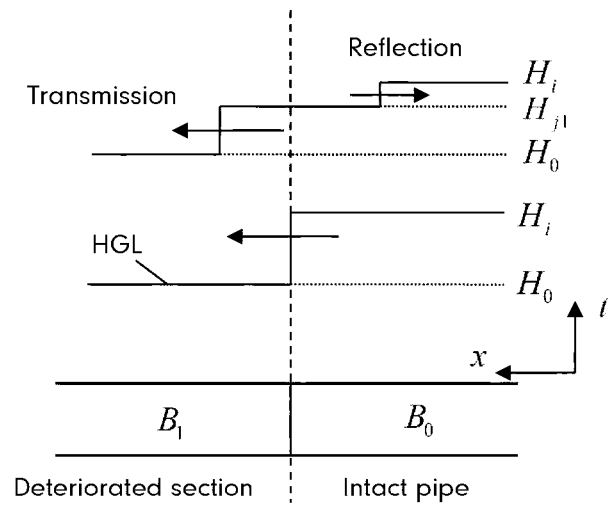
FIG. 12 is a schematic depicting the theoretical behaviour of an incident pressure wave crossing a discontinuity of impedance for the pipeline system illustrated in FIG. 11.

When a steep incident pressure wave arrives at the interface between the deteriorated section and the original intact pipe, where the discontinuity of the impedance exists, the phenomenon of wave reflection and transmission results. This is shown in FIG. 12 which is a schematic depicting the theoretical behaviour of an incident pressure wave crossing a discontinuity of impedance for the pipeline system illustrated in FIG. 11 and illustrates the wave reflection and transmission by illustrating the changes in the hydraulic grade line (HGL) ($H_0$=steady-state head; $H_i$=head of the incident wave; $H_{j1}$=head of the reflected and transmitted waves; $B_1<B_0$).

The sign and size of the wave after reflection are dependent on the impedance discontinuity. For a transient wave passing a deteriorated section a MOC analysis finds that the head value of the wave after the first reflection and transmission is $$H_{j1} = H_0 + \frac{2B_1}{B_0 + B_1}(H_i - H_0) \qquad \text{Equation 32}$$

See discussion in Gong J, Simpson A R, Lambert M F, et al., "Detection of distributed deterioration in single pipes using transient reflections", *J Pipeline Syst Eng Pract*, 2013; 4: 32-40, whose entire contents are incorporated by reference.

It can be seen from Equation 32 that the head value of the wave after reflection and transmission is independent of any flow information, but only depends on the size of the incident wave ($H_i-H_0$) and the impedance values. When $B_1<B_0$, the reflection is negative ($H_{j1}<H_i$), as shown in FIG. 12. As a result, if the head value of the reflected wave can be measured and the impedance of the intact pipe is known, the impedance of the deteriorated section can be derived from Equation 32. Similarly, when the incident wave arrives at the other boundary of the deterioration, another wave reflection and transmission process occurs. The relationship given by Equation 32 forms the basis of the RTA.

Figure 27:
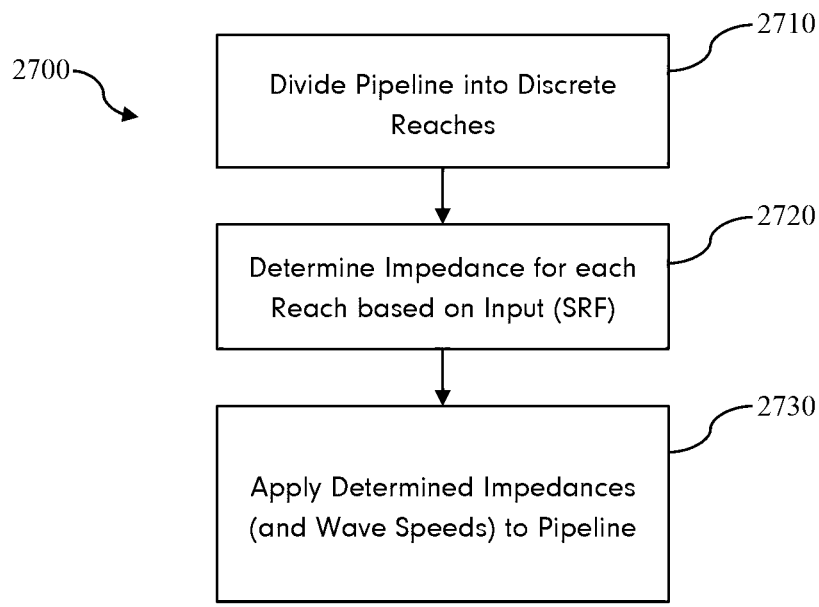
FIG. 27, is a flowchart of a method 2700 for characterising a pipeline according to a RTA procedure according to an illustrative embodiment.

Referring now to FIG. 27, there is shown a method 2700 for characterising a pipeline according to a RTA procedure. The RTA procedure determines the distribution of the impedance and wave speed from which the location, length and severity of deteriorated sections may be derived. The internal diameter of the pipeline, $D_0$, is initially assumed to be known and constant. If the pipeline is composed of several pipe sub-sections with various internal diameter values, then the diameter is assumed to be uniform within each of these sub-sections.

As step 2710, the pipe section is divided into a number of discrete reaches or sub-sections. In this embodiment, the discretisation starts from the pair of pressure measurement devices and extends towards the upstream direction. The number of discretised reaches is equal to the number of the data points to be utilised in the unit SRF. However, the specific length of each reach is unknown and yet to be determined, as it depends on the sampling interval of the SRF and the wave speed within each reach (which is estimated by the RTA method).

Figure 13:
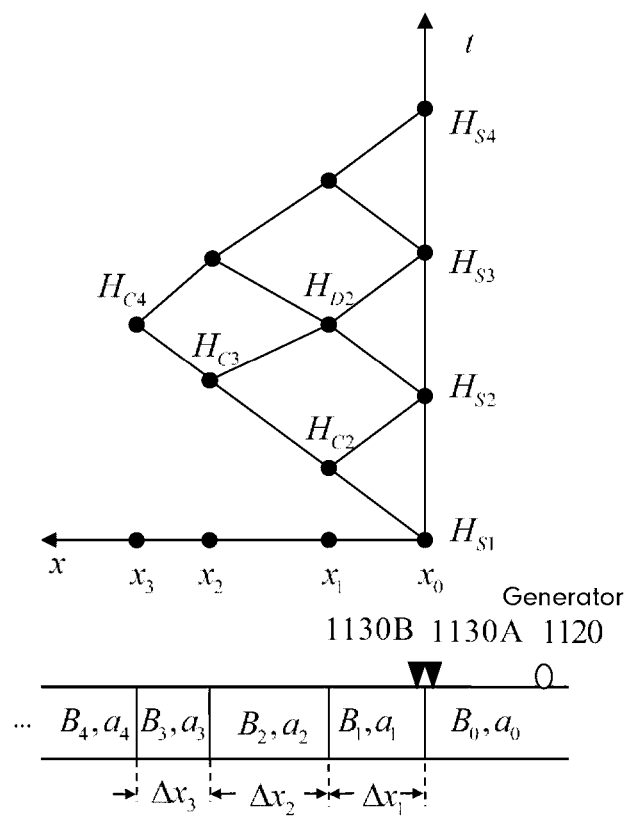
FIG. 13 is a schematic illustrating the discretisation of a pipeline section using a method of characteristics (MOC) grid for the reconstructive transient analysis (RTA) according to an illustrative embodiment.

Referring now to FIG. 13, there is shown a schematic illustrating the discretisation of a pipeline section using a MOC grid for the reconstructive transient analysis according to an illustrative embodiment. Note that the properties of each pipe reach or sub-section ($\Delta x_i$, $a_i$, $B_i$) are unknown and yet to be determined. The characteristic lines represent the transmission and reflection between the pipeline reaches on the upstream side of the pair of pressure measurement devices induced by a unit step pressure wave. Four data points (head values) of the unit SRF are presented as $H_{S1}$ to $H_{S4}$ along the vertical t axis of FIG. 13, with $H_{S1}$ representing the first measured head value at time t=0. Accordingly, in this embodiment the section of pipe is discretised into four reaches along the x axis. The length of each reach is unknown at this stage but can be described as $$\Delta x_i = x_i - x_{i-1} = a_i \Delta t \qquad \text{Equation 33}$$

where $\Delta x_i$ represents the length of the i th reach; $x_i$ denotes the location of the left boundary of this reach; $a_i$ designates the wave speed in the reach; and $\Delta t$ is the sampling interval in the unit SRF sequence. After the discretization, the RTA can be conducted for these reaches in sequence.

At step 2710, the impedance for each of the reaches is determined based on the input SRF as follows. The first value in the unit SRF, $H_{S1}$, represents the head value of the wave reflection at location $x_0$ when a unit step pressure wave arrives from the right hand side of the pressure measurement devices, where the pipeline is intact and has an impedance of $B_0$. Substituting $H_0=0$ (i.e. taking this level as the datum), $H_i=1$ and $H_{j1}=H_{S1}$ into Equation 32, the impedance of the first reach of pipe can be derived as $$B_1 = \frac{H_{S1} B_0}{2 - H_{S1}} \qquad \text{Equation 34}$$

The wave speed in the first reach, $a_1$, can be estimated using Equation 31 once the impedance $B_1$ is determined and the internal diameter is known as $D_0$. Thereafter, the length of this reach, $\Delta x_1$, can be obtained from Equation 33.

Figure 14:
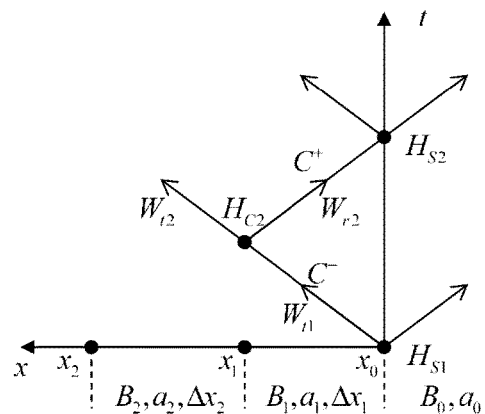
FIG. 14 is a schematic illustrating the evolution of the pressure wave propagation within the first time step of the RTA according to an illustrative embodiment where the arrows represent the direction of the wave propagation.

To estimate the impedance of the second reach ($B_2$), the transient analysis needs to be performed backwards in time. Referring now to FIG. 14, there is shown a schematic illustrating the evolution of the pressure wave propagation within the first time step according to an illustrative embodiment where the arrows represent the direction of the wave propagation.

After the first reflection and transmission at location $x_0$, the first transmitted wave ($W_{t1}$) with a head value of $H_{S1}$ propagates along the negative characteristic line $C^-$. At the interface between the first and the second reaches, ie at location $x_1$, wave reflection and transmission occurs again and the head value becomes $H_{C2}$ for both the second transmitted ($W_{t2}$) and reflected ($W_{r2}$) waves. The second reflected wave ($W_{r2}$) propagates from $x_1$ to $x_0$ along the positive characteristic line $C^+$, and when it arrives at $x_0$, the process of wave reflection and transmission occurs, yielding a head value of $H_{S2}$ that is registered in the unit SRF.

The value of $H_{C2}$ is unknown but can be estimated from $H_{S2}$ by calculating the transient backward in time along the line $C^1$. Applying the algorithm given by Equation 32 to the reflection and transmission of wave $W_{r2}$ at $x_0$, the head $H_{S2}$ may be described as $$H_{S2} = H_{S1} + \frac{2B_0}{B_0 + B_1}(H_{C2} - H_{S1}) \qquad \text{Equation 35}$$

Rearranging Equation 35 to solve for the head $H_{C2}$ yields as $$H_{C2} = H_{S1} + \frac{B_0 + B_1}{2B_0}(H_{S2} - H_{S1}) \qquad \text{Equation 36}$$

Similarly, applying Equation 32 to the reflection and transmission of wave $W_{t1}$ at $x_1$ gives $$H_{C2} = \frac{2B_2}{B_1 + B_2} H_{S1} \qquad \text{Equation 37}$$

Now substituting $H_{C2}$ from Equation 36 into Equation 37, and rearranging the terms, the impedance of the second reach can be determined as $$B_2 = B_1 \frac{(3B_0 + B_1)H_{S1} - (B_0 + B_1)H_{S2}}{(B_0 - B_1)H_{S1} + (B_0 + B_1)H_{S2}} \qquad \text{Equation 38}$$

The wave speed $a_2$ and the length of the second reach $\Delta x_2$ can then be estimated in sequence, which finalizes the analysis of the second reach.

To estimate the impedance of the third reach, the head value of $H_{C3}$ from FIG. 13 is required. However, to calculate the value of $H_{C3}$, the value of $H_{D2}$ needs to be known. The value of $H_{D2}$ in FIG. 13 can be obtained from $H_{S3}$ through the same process described in Equation 36, which can be written as $$H_{D2} = H_{S2} + \frac{B_0 + B_1}{2B_0}(H_{S3} - H_{S2}) \qquad \text{Equation 39}$$

Alternatively, using the characteristic line between $H_{D2}$ and $H_{C3}$, and the line between $H_{D2}$ and $H_{S2}$, the value of $H_{D2}$ can also be expressed as $$H_{D2} = H_{C2} + \frac{2B_1}{B_1 + B_2}(H_{C3} - H_{C2}) + \frac{2B_2}{B_1 + B_2}(H_{S2} - H_{C2}) \quad \text{Equation 40}$$

Substituting Equation 39 into Equation 40, the value of $H_{C3}$ can be obtained. Then the impedance of the third reach, $B_3$, can be estimated by applying Equation 32 to the characteristic line lining $H_{C2}$ and $H_{C3}$, which is the same process as described in Equation 37. Once $B_3$ is known, the wave speed $a_3$ and length $\Delta x_3$ are then determined from Equation 31 and Equation 33 respectively.

The process for analysing the subsequent reaches of pipe is similar to that for the third reach. The RTA continues reach by reach until the last reach of interest, or where the last value of the unit SRF is available.

At step 2730, the distribution of the impedance and wave speed as determined may then be applied to characterise the pipeline.

As would be appreciated, the RTA process does not require any information related to the transient flow. This is an advantage of this process because transient flow can be difficult to measure in real systems. In the RTA transient, analysis is conducted along characteristic lines one by one, where all the wave reflections and transmissions are considered. As a result, the RTA can appropriately handle the micro-reflections (ie, higher order reflections) between the reaches. Throughout the analysis, there is no iterative process for parameter calibration and as a result the algorithms are extremely computationally efficient, unlike a standard ITA.

Figure 15:
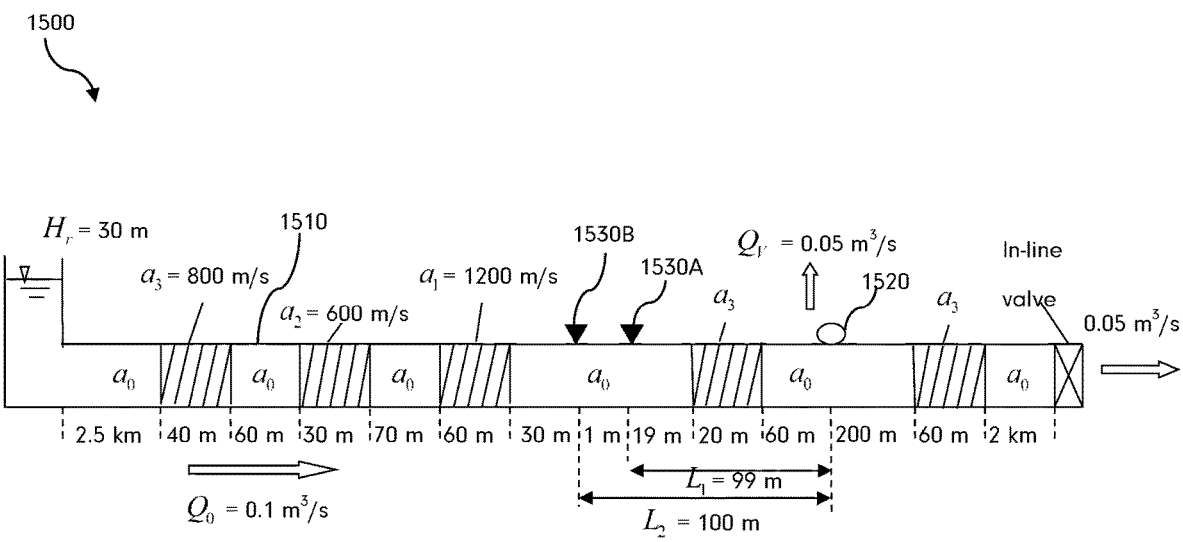
FIG. 15 is a sectional view of a pipeline system depicting another arrangement of a pressure wave generator and associated closely spaced measurement locations according to an illustrative embodiment for the purpose of conflimatory numerical simulations.

Referring now to FIG. 15, there is shown a pipeline system 1500 according to an illustrative embodiment. In this example, pipeline system 1500 is employed to verify the distributed deterioration detection technique referred to above through numerical simulations. Pipeline system 1500 is an RPV system with five deteriorated sections, where the reservoir has a head of $H_r=30$ m and the diameter of the pipeline is $D_0=0.6$ m and uniform throughout. A deteriorated section is represented as a pipe section with a wave speed different from that of the intact pipe (as shown in FIG. 15). The wave speed values in the intact sections are $a_0=1000$ m/s, and the values of $a_1$, $a_2$ and $a_3$ in the deteriorated sections are also given in FIG. 15. The impedance values are calculated using Equation 31, and they are $B_0=360.5$ s/m² for the intact sections and $B_1=432.6$ s/m², $B_2=216.3$ s/m², and $B_3=288.4$ s/m² in the deteriorated sections corresponding to the wave speed values of $a_1$, $a_2$ and $a_3$.

Friction is ignored for the numerical simulations, so the steady-state head is $H_0=H_r=30$ m throughout this pipe. The pressure wave generator 1520 is a side-discharge valve with an initial steady-state flow rate of $Q_V=0.05$ m³/s, and the incident wave is generated by shutting off the valve abruptly. The steady-state flow rate between the reservoir and the pressure wave generator 1520 is $Q_0=0.1$ m³/s. The in-line valve at the end of the pipe is partially open and the discharge is $Q_0-Q_V=0.05$ m³/s.

Conventional MOC modelling is conducted on pipeline system 1500 with the sampling frequency $F_s=2$ kHz. The head of the step pressure wave is $H_i=39.0$ m after the closure of the side-discharge valve at time $t_0=0.1$ s. Pressure wave interaction signals are measured at the pair of pressure measurement devices (1530A and 1530B) which in this example are 1 m apart and the results are depicted in FIG. 16 where $H_1(t)$ is from pressure measurement device 1530A and $H_2(t)$ is from pressure measurement device 1530B.

As expected, the two pressure wave interaction signals are similar because the two paired pressure measurement devices are located in such close proximity (1 m apart). As would be appreciated, the raw pressure wave interaction signals possess a complex structure, which is attributable to the superposition of the waves traveling along the pipe.

Figure 16:
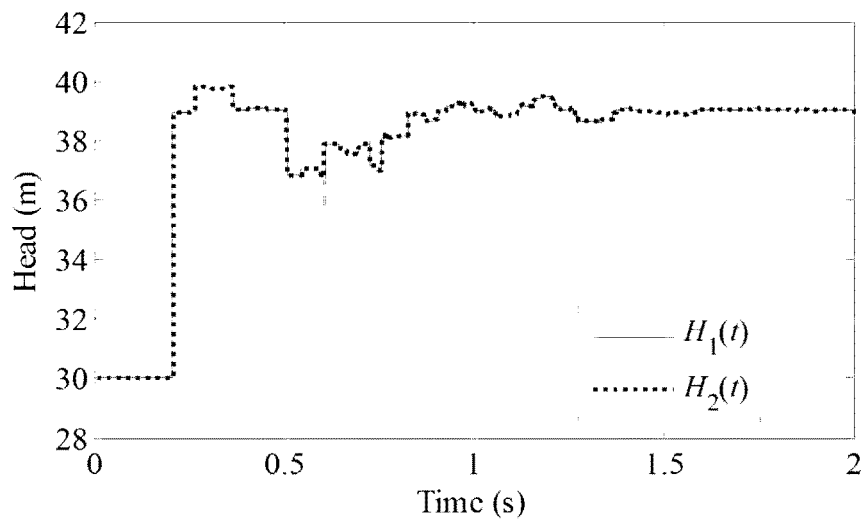
FIG. 16 is a plot of the pressure wave interaction signals measured by the pair of pressure measurement devices 1530A, 1530B in the numerical simulations where $H_1(t)$ is from pressure measurement device 1530A and $H_2(t)$ is from pressure measurement device 1530B.
Figure 17:
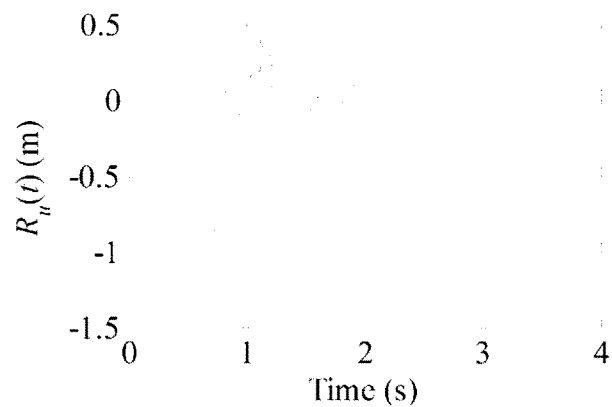
FIG. 17 is a plot of the component pressure wave interaction signal corresponding to the directional reflected pressure wave $R_u(t)$ that travels upstream.

To reduce the complexity, the component pressure wave interaction signals $R_u(t)$ and $R_d(t)$ corresponding to the directional reflected pressure waves are estimated from the pressure wave interaction signals depicted in FIG. 16. These represent the reflections traveling upstream from the pressure measurement devices and the reflections traveling downstream. The signal processing algorithm described previously in Equations 25 to 30 is applied to the pressure traces $H_1(t)$ and $H_2(t)$. The component pressure wave interaction signals $R_u(t)$ and $R_d(t)$ corresponding to the directional reflected pressure waves are shown in FIGS. 17 and 18, respectively.

Figure 18:
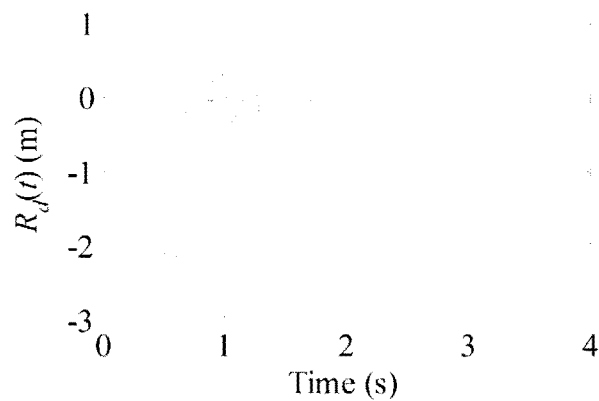
FIG. 18 is a plot of the component pressure wave interaction signal corresponding to the directional reflected pressure wave $R_d(t)$ that travels downstream.

In the component pressure wave interactions signal corresponding to $R_d$ in FIG. 18, the reflections from the three deteriorated sections are clearer than those in the raw pressure wave interaction signals in FIG. 16. However, the component pressure wave interaction signal $R_d(t)$ is still complex because of the effects of higher order reflections and the fact that $R_d(t)$ is induced by the step incident wave together with the other directional reflected pressure wave $R_u$.

Figure 19:
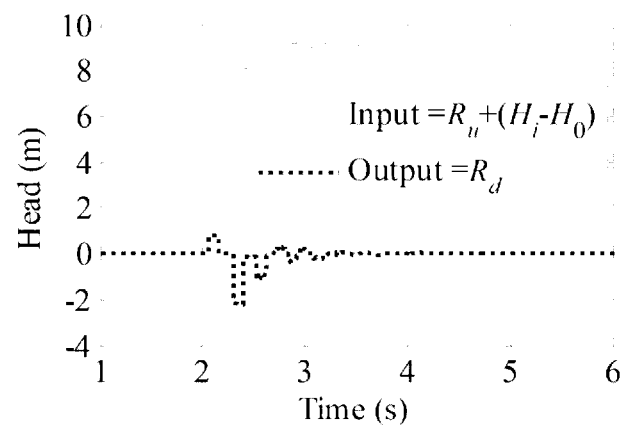
FIG. 19 is a plot of the input and the output signals for determining the unit step response function (SRF) of the pipe section upstream from the pressure measurement devices for the pipeline system illustrated in FIG. 15.

The unit step response function (SRF) is then determined from the directional reflected pressure waves for the section of pipe upstream from the pressure measurement devices. This process was performed in Matlab™ using the system identification tool box. Firstly, a high-order, non-causal finite impulse response (FIR) model is established from the input and output using correlation analysis. Then the "step( )" internal function is used to determine the unit SRF of the FIR model. In this example, the time dependent input signal is $R_u(t)+(H_i-H_0)$ and the corresponding time dependent output signal is $R_d(t)$ and both of these are plotted in FIG. 19.

Figure 20:
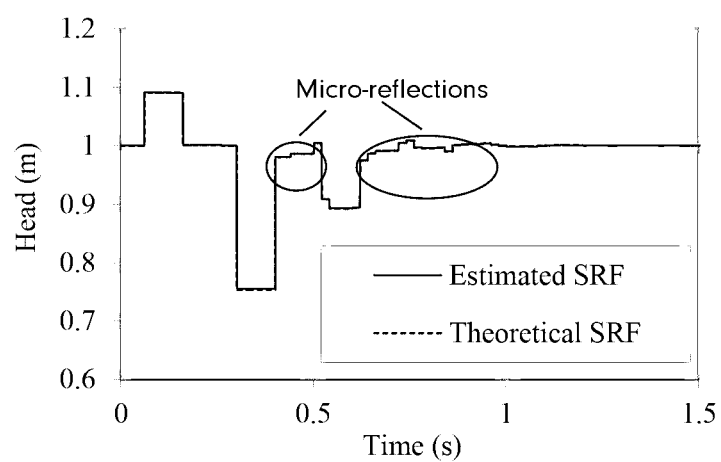
FIG. 20 is a plot comparing the estimated unit step response function (SRF) with the theoretical unit SRF determined from MOC modelling for the pipeline system illustrated in FIG. 15.

Referring now to FIG. 20, there is shown a plot comparing the estimated unit step response function (SRF) with the theoretical unit SRF determined from MOC modelling for the pipeline system 1500 illustrated in FIG. 15. In this embodiment, the theoretical unit SRF is obtained from a numerical simulation on a modified pipeline model where the entire section of pipe on the downstream side of the transducers is free of deterioration (wave speed=$a_0$, impedance=$B_0$), so that there is no reflection from the downstream side [$R_u(t)=0$ for all t]. The estimated unit SRF is observed to be equivalent to a high precision to the theoretical unit SRF, which confirms that the above approach for determining the unit SRF is applicable to an actual pipeline system.

In the estimated unit SRF, the complexity is further reduced. However, micro-reflections are still observed as perturbations with small magnitudes. These micro-reflections are the higher order reflections reflecting between the three deteriorated sections in the section of pipe upstream from the pressure measurement devices 1530A, 1530B (see FIG. 15) and induced only by the unit step wave. They can then be appropriately interpreted by the reconstructive transient analysis (RTA).

The reconstructive transient analysis (RTA) was then applied to the estimated unit SRF as shown in FIG. 20 to derive the distribution of the impedance and wave speed along the section of pipe upstream from pressure measurement devices 1530A, 1530B in the section of pipeline on the other side of pressure measurement devices 1530A, 1530B with respect to pressure wave generator 1520. Before implementation of the RTA, the impedance and wave speed of the intact pipe ($B_0$ and $a_0$) are known but the impedance and the wave speed of the deteriorated sections ($B_1$, $B_2$, $B_3$ and $a_1$, $a_2$, $a_3$) are unknown. The algorithms of RTA described previously were then applied and the plot of the estimated distribution of impedance and wave speed is given in FIG. 21. Data labels have been given for the estimated impedance distribution plot (solid line in FIG. 21).

Figure 21:
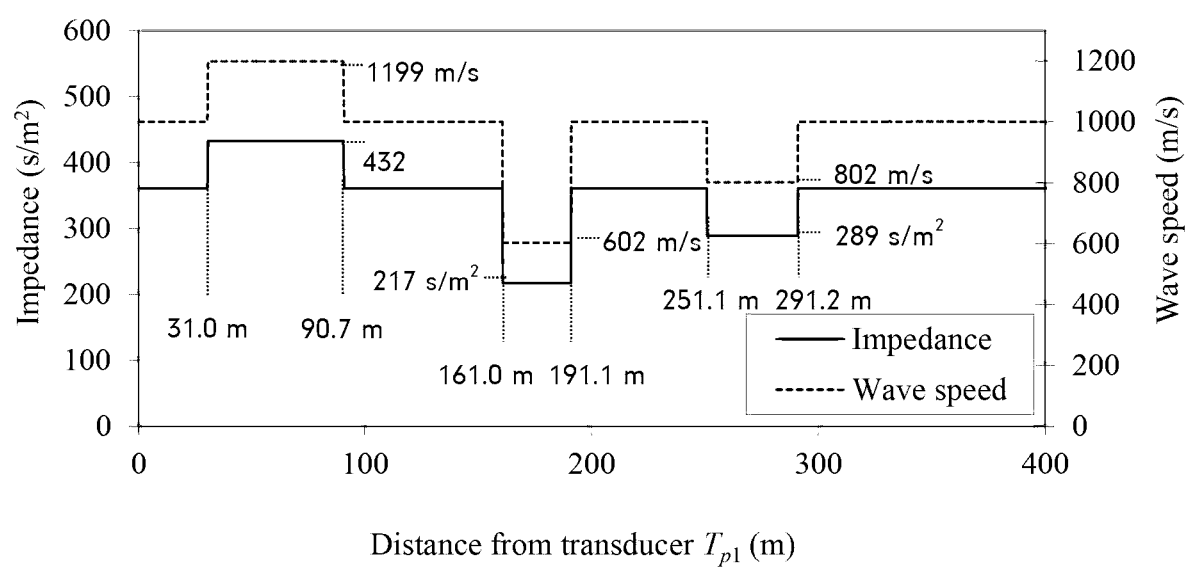
FIG. 21 is a plot of the distribution of impedances and wave speeds calculated for the pipeline system illustrated in FIG. 15 resulting from the RTA.

As can be seen from FIG. 21, the estimated values of impedance and wave speed are consistent with the theoretical values in the numerical model shown in FIG. 15. The location and length of the three deteriorated sections are also determined accurately, with absolute error less than 0.5 m. The micro-reflections shown in the estimated unit SRF (small perturbations in FIG. 20) do not have noticeable effects on the accuracy of the estimation. The results shown in FIG. 21 confirm that the above methods are able to detect multiple deteriorated sections in a single pipeline accurately under assumption of zero friction.

In this example numerical study, the effects of friction were ignored. This is because on the timescales considered in these calculations (a few seconds after the transient excitation), the effects of friction are insignificant for the proposed deterioration detection technique. The effects of steady-friction are proportional to the square value of the steady-state discharge (assuming Darcy-Weisbach friction loss modelling) in the main pipeline, which can be controlled by the in-line valve at the end of the pipeline. In practice, the in-line valve can be fully closed to minimize the effects of steady-friction. The effects of unsteady friction are related to the transient flow induced by the side-discharge valve during the generation of pressure waves. The magnitude of the transient change in flow or pressure can be controlled by the size of the opening of the side-discharge valve. A smaller opening induces a smaller transient change in flow and pressure, which in turn reduces the effects of unsteady friction. In practice, the magnitude of the transient pressure induced by the side-discharge valve should be monitored and reduced where possible, provided the desired signal-to-noise ratio (SNR) is satisfied.

For the pipeline system illustrated in FIG. 15, when a Darcy-Weisbach friction factor of f=0.02 is used, the gradient of the steady-state hydraulic grade line (HGL) is just $2.13 \times 10^{-4}$ for the section of pipe between the reservoir and the pair of transducers, which indicates that for a length of 1000 m of pipe, the head loss due to friction is just 0.213 m.

As can be readily appreciated, the RTA process only utilises pressure wave interaction signals and does not require any information about any associated transient flow. As mentioned above, the effects of friction are not generally significant as the flow rate can be controlled by the in-line valve and side-discharge valve, and only the first few seconds of the pressure responses are used for the analysis. Compared with traditional transient-based distributed deterioration detection techniques, the RTA approach is able to deal with multiple deteriorated sections in a much more computationally efficient manner.

Figure 22:
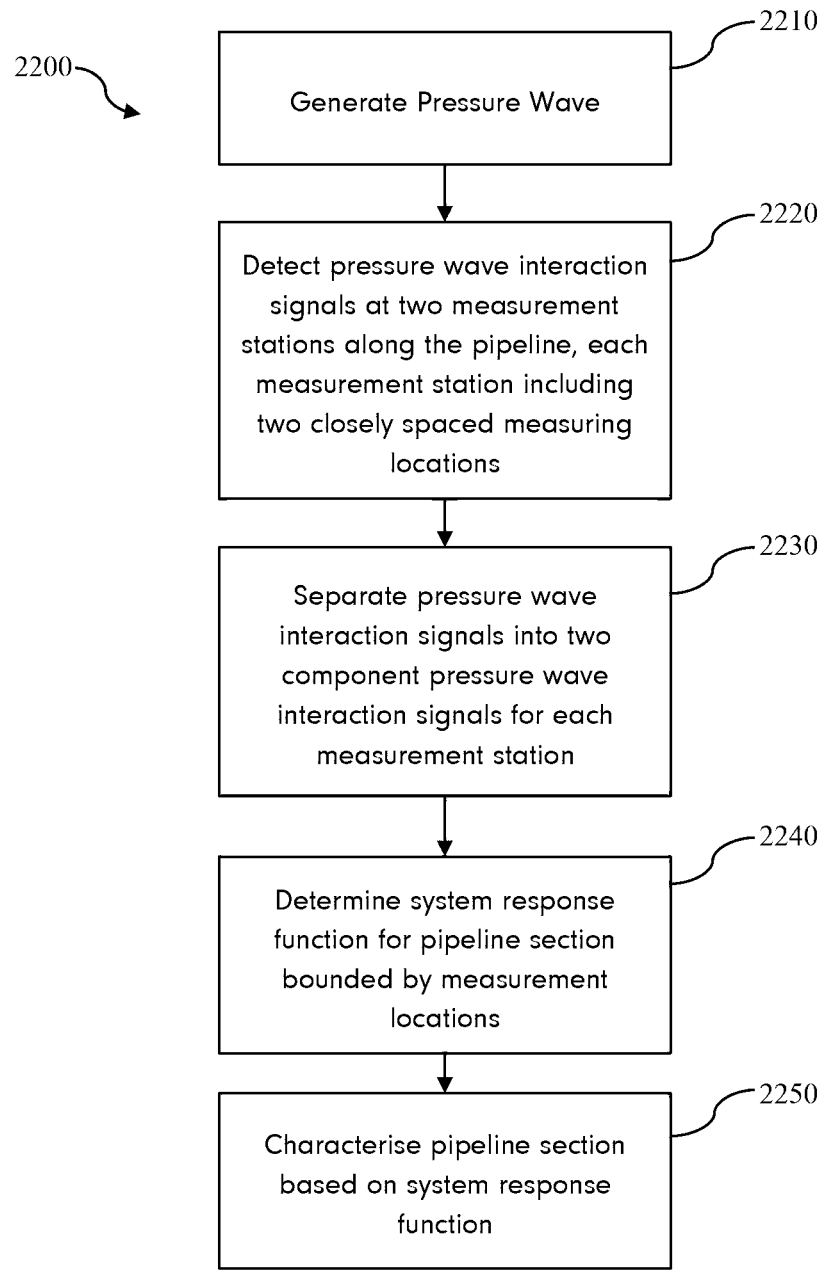
FIG. 22 is a flow chart of a method for assessing a pipeline in a pipeline system according to an illustrative embodiment.
Figure 23:
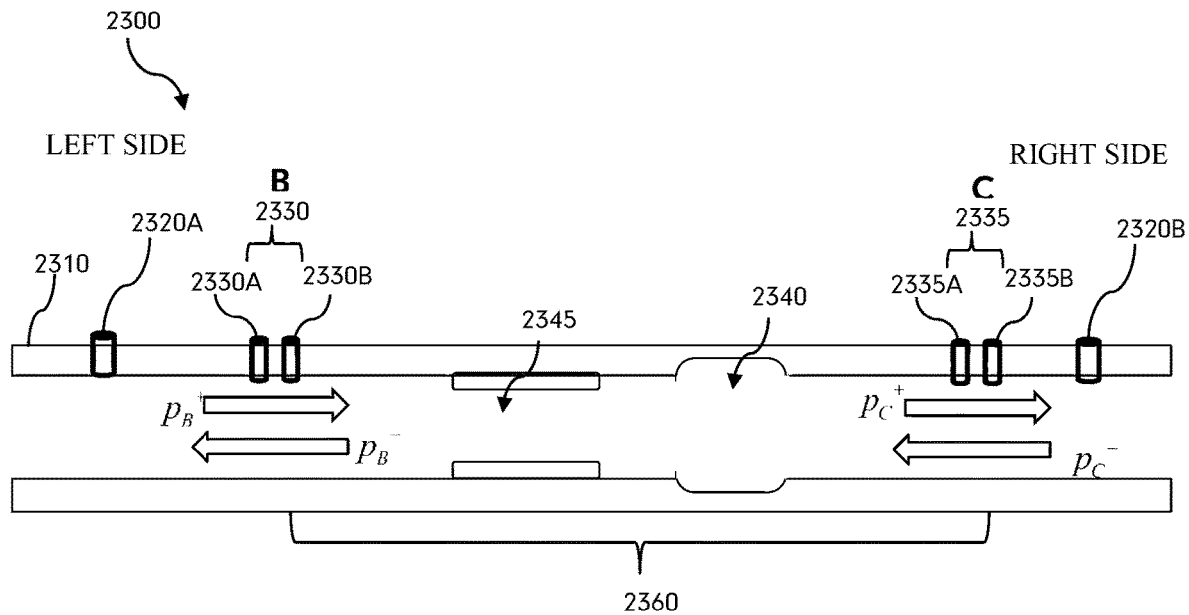
FIG. 23 is a sectional view of an example pipeline system depicting one arrangement of a pressure wave generator and associated measurement stations bounding a pipeline section according to an illustrative embodiment.

Referring now to FIG. 22, there is shown a flowchart of a method 2200 for assessing the condition of a pipeline 2210 in a pipeline system according to an illustrative embodiment. Referring also to FIG. 23, there is shown one example of a pipeline system 2300 that may be assessed in accordance with the method depicted in FIG. 22. Pipeline system 2300 is similar to pipeline system 200 illustrated in FIG. 2, except that it includes first and second measurement locations 2330, 2335 each incorporating two closely spaced pressure measurement devices 2330A, 2330B and 2335A, 2335B respectively. Pipeline system 2300 also includes optional pressure wave generator 2320B in addition to pressure wave generator 2320A.

The adoption of first and second measurement stations 2330, 2335 enables the targeting or isolation of pipeline section 2360 from a pipeline system 2300. This is particularly advantageous where the pipeline system may be very complex including multiple hydraulic features and components such as branches, loops, etc. In this manner, pipeline section 2360 bounded by measurement stations 2330, 2335 may be isolated from a complex pipeline network for analysis because all the pressure waves travelling into and out of this specific section can be determined by the wave separation process discussed above. Accordingly, this pipe section may be regarded as a two-inputs-two-outputs system.

Figure 24:
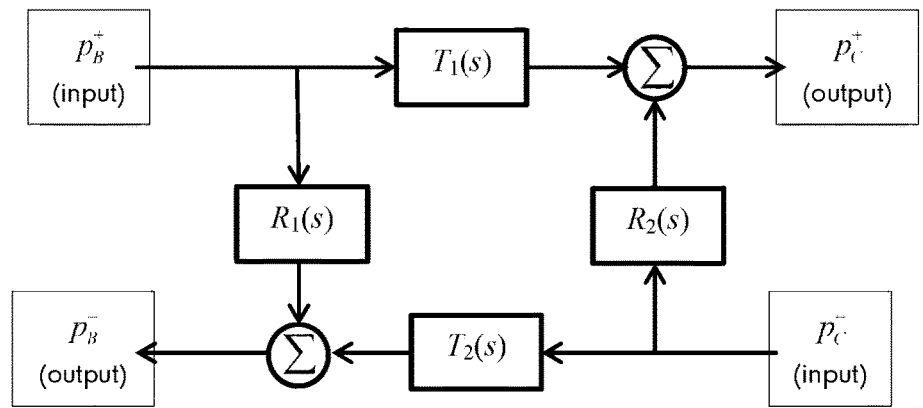
FIG. 24 is a system block diagram depicting the pressure measurement for the pipeline section bounded by two measurement locations as in the pipeline system illustrated in FIG. 23.

System identification (i.e., the determination of the system response functions) may be achieved once the inputs and the two outputs are known through system identification techniques for multi-input-multi-output (MIMO) systems. Pipeline condition assessment may then be conducted based on the analysis of the system response functions. As shown in FIG. 24, there are now four system response functions, describing the transmission and reflection of pressure waves on both sides of pipeline section 2360.

At step 2210, a pressure wave is generated by pressure wave generator 2320A. Alternatively, a pressure wave may be generated at pressure wave generator 2320B. As would be appreciated, pipeline section 2350 may be characterised in accordance with method 2200 by either pressure generating configuration.

At step 2220, the pressure wave interaction signals are measured by each of the measurement stations which involves measurement at each of the respective closely spaced measurement locations 2330A, 2330B and 2335A, 2335B by pressure measurement devices providing four separately measured pressure wave interaction signals.

At step 2230, each of the pressure wave interaction signals corresponding to each measurement location 2330A, 2330B and 2335A, 2335B are then separated into their component pressure wave interaction signals corresponding to the directional pressure waves measured at that location.

At step 2240, the system response function is determined for the pipeline section 2360. In one example, the response functions depicted in FIG. 24 may be determined by MIMO system identification techniques, such as the subspace method, which involves the establishment of a mathematical model to describe the behaviour of the system and then the calibration of the control parameters in the model.

In another embodiment, the system response is determined by determining the pipeline transfer matrix which describes the relationship between the two sets of pressure and flow as observed at the two boundaries. Referring again to FIG. 23, the pipeline section 2360 between measurement locations 2330 and 2335 can be considered as a linear time invariant (LTI) system. The directional travelling waves $P_B^+$ and $P_C^-$ (which are travelling into pipeline section 2360) are taken as the input; while the waves $P_B^-$ and $P_C^+$ (that are travelling out of pipeline section 2360) are taken as the output. Once the directional pressure waves at the two boundaries of pipeline section 2360 are obtained, pipeline section 2360 can be regarded as an independent system as the boundary conditions are entirely specified. As a result, two pairs of pressure measurement devices enable the analysis of a specific section of pipeline section 2360 independently from the complexities of the rest of the pipeline system 2300.

The transfer matrix is a full representation of the physical characteristics of a system. The transfer matrix of a pipeline system is defined to describe the relationship between the two sets of pressure and flow as observed at the two boundaries, and the relationship can be written as $$\begin{bmatrix} P \\ Q \end{bmatrix}_D = T \begin{bmatrix} P \\ Q \end{bmatrix}_U \qquad \text{Equation 41}$$

where P and Q are the pressure and flow, the footnotes D and U represent the downstream and the upstream boundary of the pipe section respectively, T is the transfer matrix that describes how the pressure and flow at the upstream boundary affect the pressure and flow at the downstream boundary.

The transfer matrix T can be described by four transfer functions as follows $$T = \begin{bmatrix} T_{11} & T_{12} \\ T_{21} & T_{22} \end{bmatrix} \qquad \text{Equation 42}$$

where the matrix variables $T_{11}$, $T_{12}$, $T_{21}$, and $T_{22}$ are functions of frequency and pipeline physical details.

Two sets of tests, with different locations of the pressure wave source, need to be conducted to enable determination of the pipeline transfer matrix. In the measurement scenario depicted in FIG. 23, the pressure wave generator 2320A is used as the excitation source in the first set of tests, and then the pressure wave generator 2320B is used as the excitation source in the second set of tests. Alternatively, the location of pressure wave generator 2320A may be shifted to provide the pressure wave in the second set of tests.

Referring to FIG. 23, at pipe cross section B, the flow rate $Q_B$ can be expressed by $$Q_B = \frac{P_B^+ - P_B^-}{Z_C} \qquad \text{Equation 43}$$

where $Z_C$ is the characteristic impedance which is a complex-valued function independent of space and time. $Z_C$ can be described by $$Z_C = \frac{a}{gA} \sqrt{\frac{[s + R(s)]}{[s + C(s)]}} \qquad \text{Equation 44}$$

For elastic pipelines, the pipe wall compliance can be neglected, and $Z_C$ can be described by $$Z_C = \frac{a^2 \Gamma(s)}{gAs} \qquad \text{Equation 45}$$

The directional waves $P_B^+$ and $P_B^-$ can be obtained by the wave separation algorithm discussed above using two or more closely spaced pressure measurement devices at measurement station 2330. Then $Q_B$ can be determined from Equation 43. Similarly, the flow at point C, $Q_C$, can also be determined. From the generation of the first pressure wave (in which pressure wave generator 2320A is used), two state vectors $[P_B \; Q_B]^T$ and $[P_C \; Q_C]^T$ are obtained, and from the generation of the second pressure wave (in which pressure wave generator 2320B is used) another two state vectors $[P'_B \; Q'_B]^T$ and $[P'_C \; Q'_C]^T$ are obtained. Based on Equation 41, the state vectors measured from the pressure waves generated by first and second pressure wave generators 2320A, 2320B respectively are related by the equation $$\begin{bmatrix} P_B & P'_C \\ Q_B & Q'_C \end{bmatrix} = \begin{bmatrix} T_{11} & T_{12} \\ T_{21} & T_{22} \end{bmatrix} \begin{bmatrix} P_C & P'_B \\ Q_C & Q'_B \end{bmatrix} \qquad \text{Equation 46}$$

As a result, the transfer matrix T can be determined, $$T = \begin{bmatrix} T_{11} & T_{12} \\ T_{21} & T_{22} \end{bmatrix} = \qquad \text{Equation 47}$$

$$\frac{1}{P_C Q'_B - P'_B Q_C} \begin{bmatrix} P_B Q'_B - P'_C Q_C & P_C P'_C - P'_B P_B \\ Q_B Q'_B - Q'_C Q_C & P_C Q'_C - P'_B Q_B \end{bmatrix}$$

All the characteristics of the section of pipe between the two multi-transducer units are described by the transfer matrix, which are independent from the rest of the pipeline system. Once the transfer matrix elements are known, other properties of the test system such as the impulse response may then be calculated.

At step 2250, pipeline section 2360 is characterised based on the system response function. Where the system response function is in the form of the system transfer matrix, pipeline section 2360 may be characterised by one of two illustrative methods, namely the incremental transfer matrix matching method or the inverse transfer matrix method.

Figure 25:
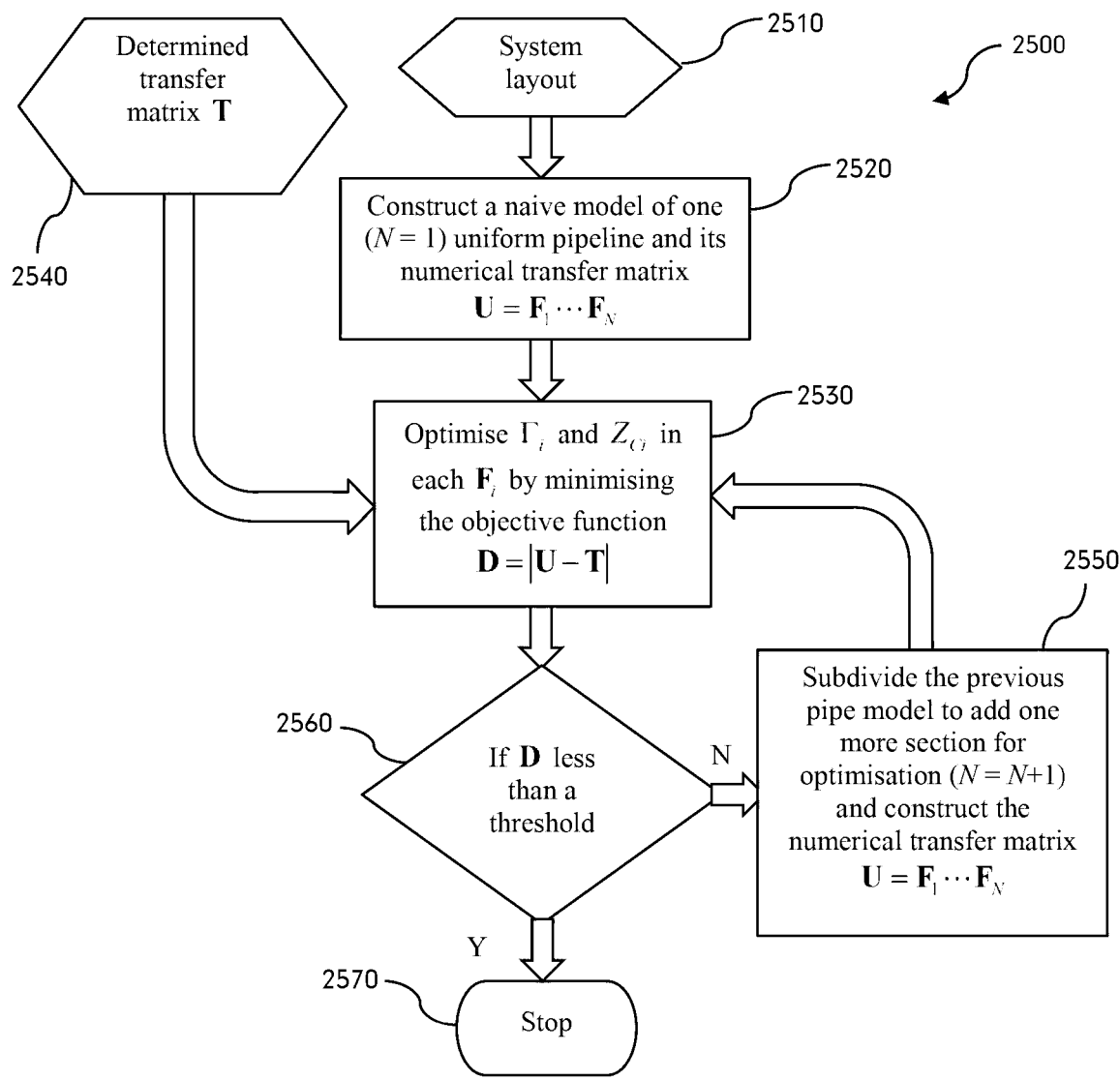
FIG. 25 is a flow chart of a method 2500 illustrating the process of the incremental transfer matrix matching method.

Referring now to FIG. 25, there is shown a flowchart of the incremental transfer matrix matching method 2500 according to an illustrative embodiment. In this example, the pipeline model is characterised by incrementally increasing the model complexity until a fully characterised description of pipeline section 2360 is provided.

At step 2510, the basic assumed physical parameters for pipeline system 2300 and pipeline section are input into the pipeline model.

At step 2520, pipeline model is initialised with a uniform single pipeline section and the transfer matrix is calculated numerically. It is instructive now to review how a theoretical transfer matrix may be determined as this will serve as a comparison to the measured transfer matrix in constructing a model of the pipeline system.

Figure 26:
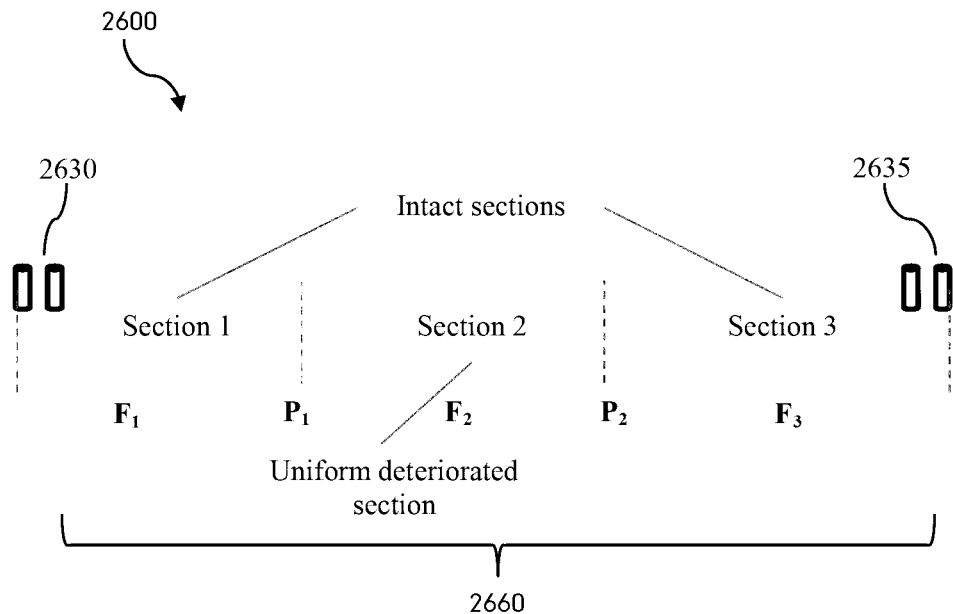
FIG. 26 is a system diagram of a pipeline model for determining the transfer matrix of the pipeline system illustrated in FIG. 23.

Referring now to FIG. 26, there is shown a pipeline model 2600 including two measurement stations 2630, 2635 and a pipeline section 2660 that is to be assessed. The theoretical transfer matrix of pipeline section 2660 bounded by the two measurement locations 2630, 2635 may be derived using the transfer matrix method and describes the transient behaviour of the system in the frequency domain. In line with the transfer matrix method, there are three types of matrices: the overall matrix, the point matrix and the field matrix.

The point matrix P relates the upstream and downstream state vectors at a point of discontinuity, such as a valve, a junction, or other special hydraulic elements. The field matrix F represents a section of uniform pipe. The overall matrix U describes the relationship between the state vectors at the upstream and those at the downstream of a pipeline system, which is a combination of the field matrices and the point matrices for all the sections and elements in the system.

The general form of the field transfer matrix F for a uniform pipe section is given by $$F = \begin{bmatrix} \cosh\Gamma(s)x & -Z_C\sinh\Gamma(s)x \\ -\dfrac{1}{Z_C}\sinh\Gamma(s)x & \cosh\Gamma(s)x \end{bmatrix} \quad \text{Equation 48}$$

At a junction between two sections of pipes, the flow and pressure are continuous. If minor loss effects at the junctions are neglected, the point matrix P of a junction can be expressed as $$P = \begin{bmatrix} 1 & 0 \\ 0 & 1 \end{bmatrix} \quad \text{Equation 49}$$

To illustrate the effect on the theoretical transfer matrix, assume there is one uniformly deteriorated pipe section in the pipeline model as depicted in FIG. 26. Pipeline model may be regarded as a series system that consists of three sections of pipeline: section 1 and section 3 are the intact pipeline sections, and section 2 is the deteriorated pipeline section that has a different pipe wall thickness, diameter, and/or wave speed. In the frequency domain, section 2 will have a different propagation operator $\Gamma(s)$ and characteristic impedance $Z_C(s)$ from sections 1 and 3.

The overall calculated transfer matrix U for the test pipeline model with one uniformly deteriorated pipe section as shown in FIG. 26 can then be described as $$U = F_1 P F_2 P F_3 = F_1 F_2 F_3 \quad \text{Equation 50}$$

Turning back to method 2500, at step 2520, for the simple uniform single pipeline section that is initially assumed, the transfer matrix of pipeline model is simply the field transfer matrix of the pipeline, ie $U=F_1$, where $F_1$ is a function of $\Gamma_1$ and $Z_{C1}$.

At step 2530, the values of $\Gamma_1$ and $Z_{C1}$ are determined within their reasonable physical ranges by minimising the difference between the numerical transfer matrix U and the experimentally determined transfer matrix T 2540 by calculating and minimising the residual D=|U−T| or an objective function in another form in an optimisation procedure.

At step 2560, a threshold is applied to the residual D. If D is small enough after the optimisation procedure, then at step 2570 the optimised pipeline model is deemed as an appropriate description of the actual pipeline system being assessed and the process is stopped. If D is above threshold, then the model pipeline is subdivided to include a further variable sub-section that may be varied in the optimisation procedure at step 2550. The optimisation process then repeats at step 2530 until an acceptable residual D is obtained.

Following method 2500, a pipeline model consisting of a various number of sub-sections having varying degrees and types of deterioration will be determined. Free parameters in the description of each sub-section include, but are not limited to, wall thickness, pipeline diameter, wave speed, friction factor or modulus of elasticity. As an example, the deteriorated sub-section 2340 illustrated in FIG. 23 would be a pipeline subsection having a thinner wall thickness representing extended corrosion. On the other hand, deteriorated sub-section 2345 having a thicker wall would represent an extended blockage.

In another example method to determine a pipeline model having characteristics that matches a measured transfer matrix, the pipeline section bounded by the two measurement stations 2330, 2335 is a priori divided into N reaches or sub-sections, with each reach characterised by a field matrix $F_i$. The overall transfer matrix U is then constructed in line with Equation 50, which is a function of $\Gamma_i$ and $Z_{Ci}$ with i=1, 2, . . . , N. In this process, all the $\Gamma_i$ and $Z_{Ci}$ are optimised simultaneously by minimising the difference between the numerically obtained overall transfer matrix U with the experimentally determined transfer matrix T to minimise D=|U−T| or an objective function in other formats.

In this approach, the selection of the total number of reaches, N, depends on the spatial resolution required and also the maximum resolution that can be achieved (which is dependent on the bandwidth of the signal). A uniform length can be used for all the reaches to reduce the complexity of the optimisation if desired. Because the overall transfer matrix U is generated from its analytical expression, the optimisation process will be computationally efficient even if a significant number of iterations are involved in the calibration.

It will be appreciated that the above transfer matrix optimisation processes are similar conceptually to a conventional time domain ITA where a pipeline model having a number of free parameters is optimised by minimising the difference between the analytically determined pressure response with the measured pressure response. However, unlike a conventional ITA, the optimisation in the proposed technique is carried out in the frequency domain and focuses on the system transfer matrix rather than the time-domain pressure response. The frequency-domain optimisation as a result is much more computationally efficient because the numerical transfer matrix will be obtained by an analytical expression rather than the step-by-step MOC approach or similar simulation as required for the generation of a pressure response in the time-domain.

In one example, an initial pipeline model will determined for step 2510 of method 2500 illustrated in FIG. 25 based on an analysis of the step response function (SRF) of the pipeline system which be obtained from experimentally determined transfer matrix. The SRF represents the response of a pipeline to a step pressure wave, which are essentially the reflections from deteriorated pipe sections. For example, the reflection from a uniform thinner-walled pipe section is a square-shaped wave in the SRF. The arrival times, duration and sizes of the pressure wave reflections are then related to the location, length and severity of this deterioration respectively and this information may be used to derive an initial pipeline model for the optimisation process.

Throughout the specification the term "pipeline system" is taken to mean the pipeline and associated connected hydraulic components and features. Hydraulic components include, but are not limited to, various types of valves such as inline valves (partially or fully closed), scour valves and air valves; closed and open branch pipeline sections extending from the pipeline; off-takes; reservoirs; and tanks (eg, surge tanks or air vessels). Hydraulic features include, but are not limited to, changes in pipeline material, diameter or class.

Those of skill in the art would further appreciate that the various illustrative logical blocks, modules, circuits, and algorithm steps described in connection with the embodiments disclosed herein may be implemented as electronic hardware, computer software or instructions, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. As would be appreciated, the described functionality may be in varying ways for each particular application, but such implementation decisions should not be interpreted as causing a departure from the scope of the present disclosure.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope of the invention as set forth and defined by the following claims.

The invention claimed is:

1. A method for assessing the condition of a pipeline in a pipeline system, comprising:
   generating a pressure wave in the fluid being carried along the pipeline system at a pressure wave generating location along the pipeline system;
   detecting pressure wave interaction signals at two closely spaced measurement locations along the pipeline;
   determining a system response function for the pipeline based on the detected pressure wave interaction signals for each measurement location, the system response function being independent of the generated pressure wave and characterizing how the pipeline responds to any input pressure wave; and
   characterizing the pipeline based on the system response function.

2. The method according to claim 1, further comprising:
   separating the pressure wave interaction signals into two component pressure wave interaction signals for a selected measurement location, the first component pressure wave interaction signal corresponding to a first directional reflected pressure wave travelling in a first direction along the pipeline and the second component pressure wave interaction signal corresponding to a second directional reflected pressure wave travelling in an opposite direction to the first direction.

3. The method according to claim 2, wherein the system response function is determined based on the first and second component pressure wave interaction signals for each measurement location.

4. The method according to claim 2, wherein separating the pressure wave interaction signals into two component pressure wave interaction signals for the selected measurement location comprises determining the transfer function of the pipeline section between the two closely spaced measurement locations.

5. The method according to claim 4, wherein the transfer function is determined analytically from known physical characteristics of the pipeline and the detected pressure wave interaction signals.

6. The method according to claim 4, wherein determining the transfer function comprises measuring a further pressure wave interaction signal at a further closely spaced measurement location to provide a comparison measure.

7. The method according to claim 1, wherein the system response function is an impulse response function (IRF), step response function (SRF), or frequency response function (FRF).

8. The method according to claim 1, wherein the pressure wave is generated on one side of the closely spaced measurement locations and the pipeline is characterized on a side section located the on the other side of the closely spaced measurement locations with respect to the pressure wave generation location.

9. The method according to claim 1, wherein the pressure wave is generated at the same location as one of the closely spaced measurement locations and a side section located on either side of the closely spaced measurement locations is characterized.

10. The method according to claim 9, wherein the system response function is a frequency response function (FRF) or an impulse response function (IRF) for the side section.

11. The method according to claim 10, wherein the FRF or the IRF for the side section is determined based on a frequency transform of the component pressure wave interactions signals for the measurement location adjacent to the side section.

12. The method according to claim 9, wherein the system response function is a unit step response function (SRF) for the side section.

13. The method according to claim 12, wherein determining the unit SRF comprises:
   defining a time dependent system input function based on the component pressure interaction signal associated with a directional reflected pressure wave moving towards the side section;
   defining a time dependent system output function based on the component pressure interaction signal associated with a directional reflected pressure wave moving away from the side section; and
   determining the unit SRF for the side section based on solving the time dependent system output function with respect to the time dependent system input function.

14. The method according to claim 12, wherein characterizing the pipeline on the side section comprises:
   dividing the side section into a plurality of discrete sub-sections;
   determining the pipeline impedance for each of the plurality of sub-sections based on the unit SRF; and
   applying the distribution of pipeline impedances to the plurality of discrete sub-sections to determine the wave speed, length and location of each of the plurality of discrete sub-sections.

15. The method according to claim 14, wherein determining the pipeline impedance for each of the plurality of sub-sections based on the unit SRF includes applying the method of characteristics (MOC) to determine the pipeline impedance for each sub-section by progressing through each sub-section respectively.

16. The method as claimed in claim 1, comprising:
   detecting pressure wave interaction signals at a further two closely spaced measurement locations along the pipeline, the two closely spaced measurement locations defining a first measurement station and the further two closely spaced measurement locations defining a second measurement station;
separating the additional pressure wave interaction signals for the second measurement station into two component pressure wave interaction signals;
determining the system response function for the inter-station pipeline section bounded by the first and second measurement stations; and
characterizing the inter-station pipeline section.

17. The method as claimed in claim 16, wherein determining the system response function for the inter-station pipeline section comprises:
   determining the transient flow rate for each of the measurement stations from the respective component pressure wave interaction signals; and
   determining a measured system transfer matrix for the inter-station pipeline section based on the determined flow rates and the measured pressure wave interaction signals for each measurement location.

18. The method as claimed in claim 17, wherein characterizing the inter-station pipeline section comprises:
   generating a pipeline model of the inter-station pipeline section, the pipeline model consisting of a plurality of sub-sections, each sub-section dependent on at least one parameter corresponding to a physical characteristic of the respective sub-section of the inter-station pipeline section;
   calculating a proposed system transfer matrix for the pipeline model, the proposed system transfer matrix comprised of sub-system transfer matrices corresponding to each of the pipeline sub-sections;
   varying at least one parameter for each sub-section of the pipeline model to minimize an objective function based on a difference related functionally to the measured system transfer matrix and the proposed system transfer matrix.

19. The method as claimed in claim 16, wherein characterizing the inter-station pipeline section comprises:
   generating a pipeline model of the inter-station pipeline section, the pipeline model dependent on at least one parameter corresponding to a physical characteristic of the inter-station pipeline section;
   calculating a proposed system transfer matrix for the pipeline model; and
   varying the at least one parameter of the pipeline model to minimize an objective function based on a difference related functionally to the measured system transfer matrix and the proposed system transfer matrix.

20. The method as claimed in claim 19, wherein the objective function is above a minimum threshold, further comprising:
   subdividing the pipeline model into pipeline sub-sections, each of the pipeline sub-sections dependent on at least one parameter corresponding to a physical characteristic of the respective pipeline sub-section;
   calculating a modified proposed system transfer matrix for the pipeline model, the modified proposed system transfer matrix comprised of sub-system transfer matrices corresponding to each of the pipeline sub-sections;
   varying the at least one parameter for each of the sub-sections of the pipeline model to minimize the objective function now based on a difference related functionally to the measured system transfer matrix and the modified proposed system transfer matrix.

21. The method as claimed in claim 19, wherein the physical characteristic comprises:
   wave speed;
   wall thickness;
   pipeline diameter; or
   impedance.

22. A system for assessing the condition of a pipeline in a pipeline system, comprising:
   a pressure wave generator for generating a pressure wave in the fluid being carried along the pipeline system at a pressure wave generating location along the pipeline system;
   first and second pressure measurement devices for detecting pressure wave interaction signals at two closely spaced measurement locations along the pipeline; and
   a data processor configured for:
   determining a system response function for the pipeline based on the first and second detected pressure wave interaction signals for each measurement location, the system response function being independent of the generated pressure wave and characterizing how the pipeline responds to any input pressure wave; and
   characterizing the pipeline based on the system response function.

* * * * *